United States Patent [19]

Ishihara et al.

[11] Patent Number: 5,412,478
[45] Date of Patent: May 2, 1995

[54] ENDOSCOPE SYSTEM WHICH CHANGES OVER SWITCHES IN INTERLOCKING RELATION TO EACH OTHER WITHIN VIDEO PROCESSOR AND IMAGE DISPLAY APPARATUS TO PERFORM DISPLAY OF ENDOSCOPE IMAGE

[75] Inventors: Hideaki Ishihara, Hachioji; Kiyoshi Tsuji, Musashino; Akihiro Miyashita, Hachioji, all of Japan

[73] Assignee: Olympus Optical Co., Ltd., Tokyo, Japan

[21] Appl. No.: 125,162

[22] Filed: Sep. 23, 1993

[30] Foreign Application Priority Data

Sep. 30, 1992 [JP] Japan .................................. 4-261730

[51] Int. Cl.⁶ .............................................. A61B 1/045
[52] U.S. Cl. ........................................ 348/72; 348/74
[58] Field of Search ............... 348/72, 74; H04N 7/18

[56] References Cited

U.S. PATENT DOCUMENTS 4,860,094  8/1989  Hibino .................................. 348/72
5,196,928  3/1993  Karasawa ............................ 348/72
5,243,416  9/1993  Nakazawa .......................... 348/74

*Primary Examiner*—Howard W. Britton
*Attorney, Agent, or Firm*—Armstrong, Westerman Hattori, McLeland & Naughton

[57] ABSTRACT

A video processor which forms an endoscope apparatus is capable of selecting an image signal of a plurality of modes outputted from a signal processing circuit which performs signal processing with respect to an image pickup element of an endoscope, and image signals of a plurality of modes outputted from peripheral devices such as a VTR and the like, by a changing-over switch to output the image signals of the plurality of modes from a plurality of signal output ends. The plurality of output ends are connected to a plurality of input ends of an image display apparatus for performing image display. The image display apparatus is provided with a plurality of signal processing systems corresponding to the image signal of the mode inputted from the respective input ends, and is capable of selecting a single signal processing system by a changing-over switch to output the single signal processing system to a CRT. By operation of a changing-over operating switch on the side of the video processor, switching of the changing-over switch within the video processor is performed, and switching of the changing-over switch within the image display apparatus is also performed in interlocking relation thereto.

31 Claims, 16 Drawing Sheets

ENDOSCOPE SYSTEM WHICH CHANGES OVER SWITCHES IN INTERLOCKING RELATION TO EACH OTHER WITHIN VIDEO PROCESSOR AND IMAGE DISPLAY APPARATUS TO PERFORM DISPLAY OF ENDOSCOPE IMAGE

BACKGROUND OF THE INVENTION

1. Field of the Invention

The present invention relates to an endoscope system in which changing-over of switches within an image display apparatus is performed in interlocking relation to each other by selective operation on the side of a video processor with respect to a plurality of image signals different in mode from each other such as a composite video signal, an RGB signal and the like, to thereby perform display of an endoscope image by an image signal of the selected mode.

2. Related Art and Prior Art Statement

Generally, an endoscope system comprises: a light; source unit for supplying illuminating light, an endoscope, having an elongated inserting section inserted into a body cavity for photoelectrically converting an observed image, within the body cavity which is illuminated by the illuminating light supplied by the light source unit, by an optical or image pickup unit, to electrically produce the observed image as an image-pickup signal; a video processor into which the image-pickup signal produced by the endoscope is inputted and is processed in signal; and an image display apparatus into which an image signal of the video processor is inputted and is displayed in image.

Further, connected to the video processor are electric instruments which output image signals corresponding, respectively, to recorded endoscope images such as peripheral devices related to the endoscope image, such as, for example, a VTR (video tape recorder), an SVR (still video recorder), a V.DISK (video disk recorder) and the like, other than the endoscope. A signal processing section for processing the image-pickup signal of the endoscope and the peripheral devices related to the endoscope image are so arranged as to output image signals different in mode from each other, for example, a composite signal and a Y/C signal, an RGB signal.

Moreover, the image display apparatus has image-signal inputting section in a plurality of systems, and the composite signal, the Y/C signal and the RGB signal, for example, are inputted to the image display apparatus. Accordingly, a selective switch for the composite signal, the Y/C signal, and the RGB signal both on the side of the video processor and on the side of the image display apparatus, is so required as to be selectively changed over, depending upon what any one of the modes output image signal of the endoscope connected to the video processor and selected or output image signals of the peripheral devices related to the endoscope image is.

In the endoscope system of the prior art example, it is required to change over the signal-mode selective switches of both the video processor and the image display apparatus, correspondingly to the mode of the image signal which is outputted by the endoscope connected to the video processor and selected, or the peripheral devices related to the endoscope image. It is complicated or troublesome operation in such prior art to change over both the signal-mode selective switches.

Furthermore, there are the following disadvantages. That is, because in such prior art, there are many cases where the image display apparatus is established in separation from the video process or and operability is further deteriorated. Further, there are many fears to perform false or mistaken operation, such as to select the image signal, or the like, of the device different from the device selected by operation on the side of the video processor.

OBJECTS AND SUMMARY OF THE INVENTION

It is an object of the present invention to provide an endoscope system superior in operability in which only operation of a selective switch on the side of a video processor makes it possible to select a device connected to the video processor, and in which a signal processing section on the side of an image display apparatus can be set to a signal processing condition corresponding to a mode of an image signal of a selected device.

It is an another object of the invention to provide an endoscope system which is less in fear to perform false operation.

According to the invention, there is provided an endoscope system comprising: a video processor for performing signal processing with respect to an image pickup element incorporated in an endoscope, the video processor incorporating a signal processing device for outputting an image signal, the video processor being connected to endoscope peripheral devices for outputting an image signal corresponding to a recorded endoscope image, the video processor having changing-over means for selecting at least one image signal of the signal processing device and the endoscope peripheral devices to output the image signal from at least one of a plurality of output ends; and an image display apparatus having a plurality of signal processing sections for performing signal processing in accordance with a mode of image signals inputted respectively from a plurality of input ends, the image display apparatus having a changing-over section, the image display processing sections being selected by the changing-over sections to lead an image processed in signal, to image display means.

The arrangement is such that the changing-over section on the side of the image display apparatus is changed over in accordance with selective operation of the changing-over means on the side of the video processor, to realize improvement of operabillty and reduction of false operation.

BRIEF DESCRIPTION OF THE DRAWINGS

FIG. 2 is an arrangement view showing an arrangement of an electronic endoscope and a signal processing circuit;

FIG. 3 is a circuit view showing an arrangement in the vicinity of a changing-over operation switch;

FIG. 5 is a circuit view showing an arrangement of a scope IF;

FIG. 7 is a block diagram showing an arrangement of a signal-mode detecting circuit;

FIG. 9 is a block diagram showing an endoscope system for a PAL;

FIGS. 10a and 10b are explanatory views in a case where an endoscope image displayed by a CRT is displayed in normal size and enlarged size;

FIG. 18 is a waveform view showing a horizontal drive signal which is applied to a CRT; and FIGS. 19a and 19b are explanatory views showing, respectively, an image having image distortion and an image in which the image distortion is corrected.

DETAILED DESCRIPTION OF THE PREFERRED EMBODIMENTS

Figure 1:
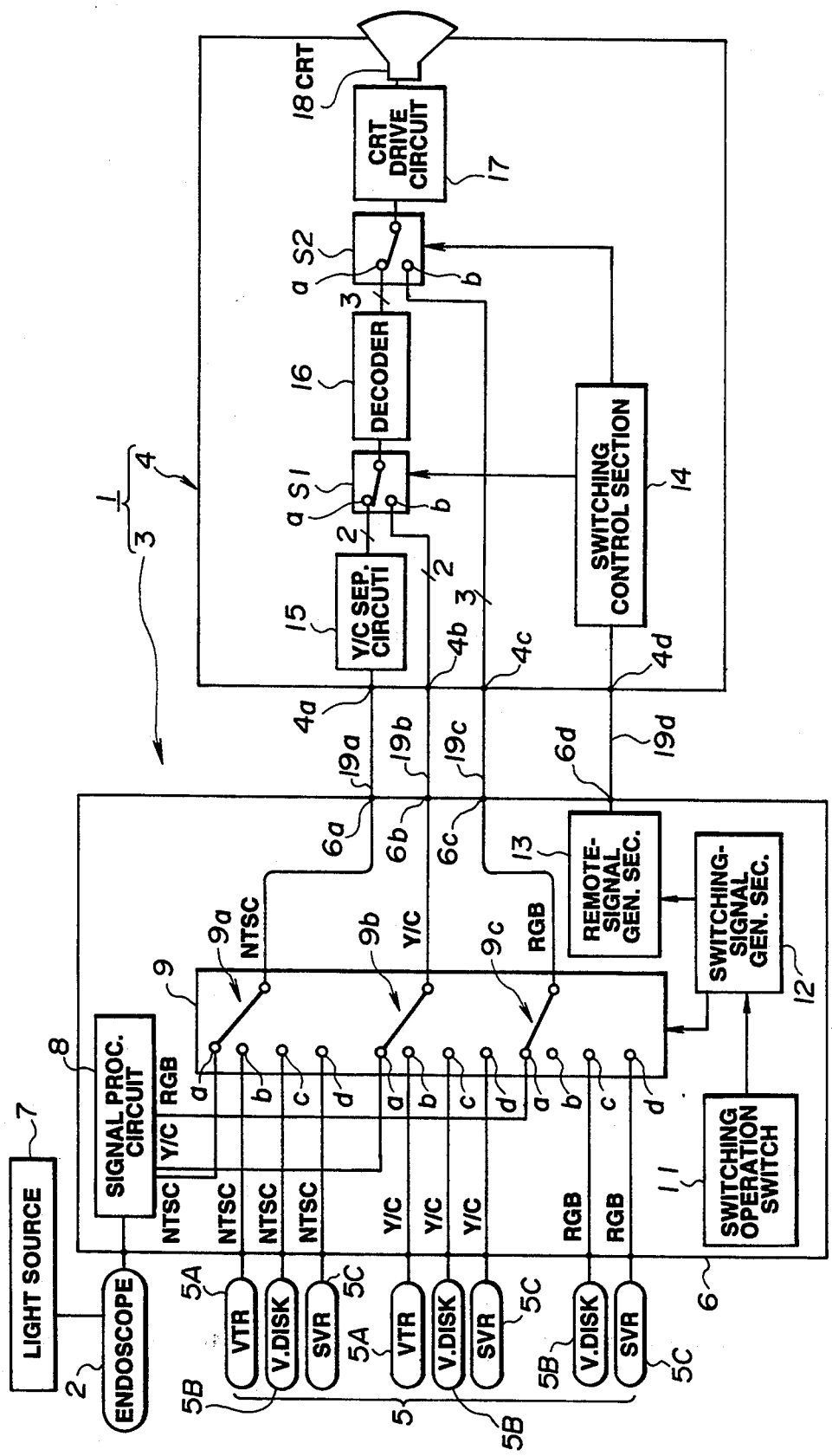
FIGS. 1 to 3 relate to a first embodiment of the invention, FIG. 1 being a block diagram showing an arrangement of an endoscope system according to the first embodiment of the invention.

An endoscope system 1 according to a first embodiment of the invention, shown in FIG. 1, comprises an endoscope apparatus 3 including an electronic endoscope 2 and an image display apparatus 4 connected to the endoscope apparatus 3 for displaying an image.

The endoscope apparatus 3 comprises the electronic endoscope 2 incorporating an image pickup element, a plurality of peripheral devices (hereinafter, referred to as "endoscope peripheral devices") 5 related to an endoscope image, a video processor 6 to which the electronic endoscope 2 and the endoscope peripheral devices 5 are connected, and a light-source unit 7 for supplying illuminating light to the electronic endoscope 2. The video processor 6 has a plurality of signal output terminals 6a~6d which are connected respectively to a plurality of signal input terminals 4a~4d of the image display apparatus 4.

A VTR 5A, a V.DISK 5B and an SVR 5C, for example, which serve as the endoscope peripheral devices 5 have respective video-signal output ends thereof which are connected to the video processor 6. These devices output respective video signals thereof corresponding to the endoscope image, in three (3) modes. That is, the devices output an NTSC composite video signal, a Y/C signal and an RGB signal. For example, the VTR 5A outputs the NTSC composite video signal and the Y/C signal, while the V.DISK 5B and the SVR 5C output respective video signals thereof of three (3) modes.

The video processor 6 incorporates a signal processing circuit 8 for processing the image pickup signal of the endoscope 2, and outputs the NTSC composite signal, the Y/C signal and the RGB signal from the signal processing circuit 8. Further, the video processor 6 has a switching section 9 for selecting an optional video signal which is outputted from the signal processing circuit 8 and the endoscope peripheral devices 5. That is, the switching section 9 has three (3) changing-over switches 9a, 9b and 9c correspondingly, respectively, to the video signals of three (3) modes. The changing-over switches 9a, 9b and 9c output the selected NTSC composite signal, Y/C signal and RGB signal to the image display apparatus 4 from the signal output terminals 6a, 6b and 6c, respectively.

In connection with the above, the devices 5, such as the VTR 5A, or the like have a video-signal input end which are connected, respectively, to a video-signal output ends(not shown) of the signal processing circuit 8. An endoscope image, which is image-picked up by the endoscope, such as, the electronic endoscope 2, or the like, is recorded. A reproducing switch is operated whereby video signals, corresponding to the recorded endoscope image, are outputted from the output ends.

The video signals of these three modes are such that the image quality is generally brought to the order of the RGB signal, the Y/C signal and the composite signal. That is, generally, in a case of the same devices, the image quality (image display characteristic) is the best in a case where the image is displayed by the RGB signal, and the image quality is reduced in a case of the composite signal. However, because the mode of the composite signal is the most diffused or popularized, there is a merit that even the image signal of this mode can be used in almost all units. Moreover, if image recording is performed by the composite signal, there is a merit that less recording capacity is sufficient.

For example, the changing-over switch 9a selects one from four (4) NTSC composite video signals and outputs the one signal to the image display apparatus 4. The changing-over switch 9b selects one from four (4) Y/C signals to output the one signal to the image display apparatus 4. The changing-over switch 9c selects one from three (3) RGB signals and outputs the one signal to the image display apparatus 4.

The switching section 9 is arranged such that, for example, a switching operation switch 11 provided on the video processor 6 is operated whereby one signals selected, respectively, by the three (3) changing-over switches 9a, 9b and 9c are decided or determined by a switching signal which is outputted through a switching-signal generating section 12.

Further, the switching signal, outputted from the switching-signal generating section 12, is inputted to a remote-signal generating section 13. A remote signal, outputted from the remote-signal generating section 13, is inputted to a switching control section 14 within the image display apparatus 4, through a remote-signal transmitting cable 19d. The switching control section 14 controls switching, at a switching section within the image display apparatus 4, so that a signal processing system, with respect to an image signal of a mode corresponding to operation of the switching operation switch 11, is selected.

That is, to be described subsequently, a plurality of signal processing systems, corresponding, respectively, to modes of the image signal inputted from the plurality of input ends 4a~4c are arranged within the image display apparatus 4, and a pair of changing-over switches S1 and S2 are switched, whereby signal processing suited for the image signals of the modes is performed, to perform conversion to a common image signal (RGB signal) which is capable of being displayed by a CRT 18. Moreover, the image display apparatus 4 has also the input end 4d to which a remote signal for switching the changing-over switches S1 and S2 is inputted.

The first signal output end 6a connected to a common contact of the changing-over switch 9a, is connected to the first signal input end 4a of the image display apparatus 4 through a transmission cable 19a. The first signal input end 4a is connected to a Y/C separation circuit 15. Accordingly, an NTSC composite signal, transmitted through the transmission cable 19a, is inputted to the Y/C separation circuit 15.

The Y/C separation circuit 15 is arranged by a trap circuit and a band filter, for example. The Y/C separation circuit 15 separates the inputted NTSC composite signal into a luminance or intensity signal Y and a chroma signal C and guides them to a decoder 16 through the first changing-over switch S1.

In connection with the above, a contact a between the Y/C separation circuit 15 and the first changing-over switch S1 is, in fact, connected by a pair of signal lines (except a GND line) which transmit the intensity signal Y and the chroma signal C, respectively. Accordingly, the contact a is indicated by 2 in the vicinity of/(the other signal lines are also transcribed similarly).

The second signal output end 6b, to which the common contact of the changing-over switch 9b is connected, is connected to the second signal input end 4b through a transmitting cable 19b. The second signal input end 4b is connected to a contact b, of the first changing-over switch S1, to guide the Y/C separation signals, transmitted through the transmitting cable 19b, that is, the intensity signal Y and the chroma signal C, to the decoder 16 through the first changing-over switch S1.

The decoder 16 is formed by a matrix circuit and the like. The decoder 16 converts the inputted intensity signal Y and chroma signal C to the RGB signal, and guides the RGB signal to a CRT drive circuit 17 through the contact a of the second changing-over switch S2.

The second changing-over switch S2 has a contact b to which a common contact of a changing-over switch 9c is connected through the transmitting cable 19c. The RGB signal, selected by the second changing-over switch S2, is guided to the CRT drive circuit 17.

The CRT drive circuit 17 converts the inputted RGB signal to the drive signal which is displayed by the CRT 18. The CRT drive circuit 17 collides electronic beams for respective R, G and B against luminescent material or phosphor of RGB which are arranged on a tube surface of the CRT 18, to excite the luminescent material of RGB, to thereby emit light. By the light emission, an endoscope image converted to an RGB signal is displayed in color by the CRT 18.

The first and second changing-over switches S1 and S2 are controlled in switching by the switching control section 14. The switching control section 14 performs switching of the first and second changing-over switches S1 and S2 on the basis of the remote signal which is transmitted from the remote-signal generating section 13.

The present first embodiment is characterized by the following arrangement. That is, the changing-over switch 11 is operated whereby the switching section 9, within the video processor 6 is switched by a switching signal which is outputted from the switching signal generating section 12, and a remote signal generated on the basis of the switching signal is transmitted to the image display apparatus 4. The changing-over switches S1 and S2, within the image display apparatus 4, are switched in interlocking with switching on the side of the video processor 6. A signal processing system, corresponding to a mode of the selected image signal, is selected. A signal, passing through the selected signal processing system is displayed by the CRT 18.

Figure 2:
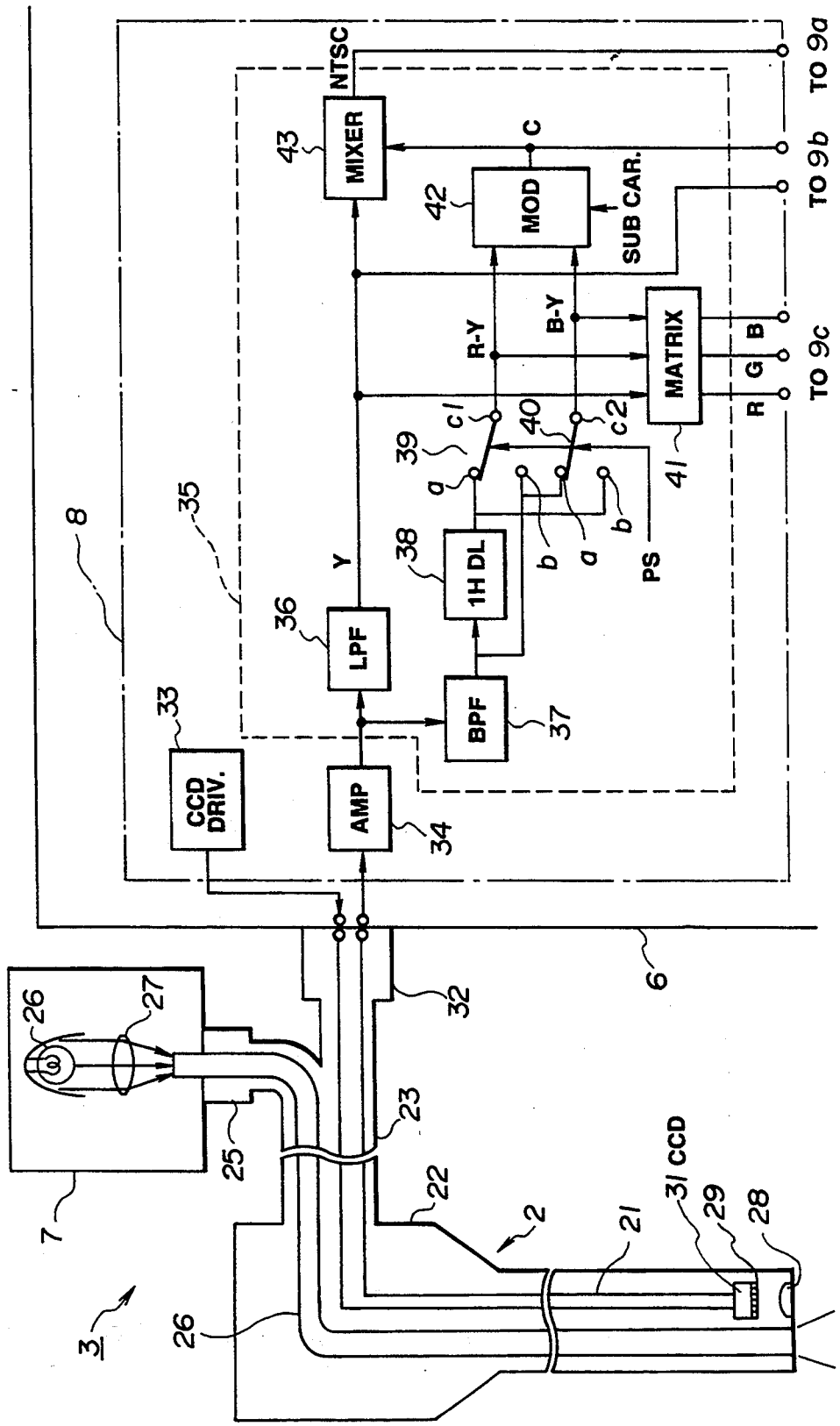

FIG. 2 shows an arrangement of the electronic endoscope 2 and the signal processing circuit 8 cooperate with each other to form the endoscope apparatus 3. The electronic endoscope 2 FIG. 2 comprises an elongated inserting section 21, an operating section 22 provided with a curved operating knob and the like (not shown) which are provided on a proximal end of the inserting section 21, and a universal cable 23 extending from the operating section 22.

A light guide 24, for transmitting illuminating light, is inserted into the inserting section 21 and the universal cable 23. A light guide connector 25, at a distal end of the universal cable 23, is mounted on the light source unit 7, whereby the illuminating light of a lamp 26 within the light source unit 7 is converged or condensed by a condenser lens 27 and is supplied to an end face of the light guide connector 25.

The illuminating light, transmitted by the light guide 24, is outgone forwardly from an outgoing end face which is fixed to an illuminating window at a forward end of the inserting section 21, to illuminate a subject such as an affected or diseased part, or the like.

The illuminated subject is image-formed onto a focal surface of an objective lens 28 by the objective lens 28 which is mounted on an observing window, located adjacent to the illuminating window. A CCD 31, on which a color separating filter 29 is mounted, is arranged on the focal surface. An optical image is optically color-separated into R, G and B in a unit of pixels by the color separation filter 29 and is image-formed on the CCD 31.

The CCD 31 has function of photoelectric conversion, and generates an electric signal (image pickup signal) corresponding to an optical image. An electric connector 32, at a distal end of the universal cable 23, is connected to the video processor 6, whereby a CCD drive signal, outputted from a CCD driver 33 within the signal processing circuit 8, is applied to the CCD 31.

The image pickup signal, outputted from the CCD 31 by application of the CCD drive signal, is amplified by an amplifier 34 and, subsequently, is inputted to an LPF 36 and a BPF 37 which cooperate with each other to form an image-signal generating circuit 35.

The intensity signal Y is generated by passing through the LPF 36. The color-difference signal R-Y/B-Y of line-serial is generated by passing through the BPF 37. The color-difference signal R-Y/B-Y of line-series is a color-difference signal which is brought to R-Y and B-Y every a single horizontal line. Accordingly, the color-difference signal R-Y/B-Y of line-series passes through switches 39 and 40 which are switched in interlocking with a 1 H delay line 38 of a delay amount of 1 H (1 horizontal period of time), whereby color-difference signals R-Y and B-Y are outputted, respectively, from common contacts c1 and c2. The switches 39 and 40 are switched in interlocking with the side of contacts a and the side of contacts b by a pulse signal PS which is brought to "1" and "0" every 1 H.

The intensity signal Y and the two (2) color-difference signals R-Y and B-Y are inputted to a matrix circuit 41, and are converted to RGB signals by the matrix circuit 41. The RGB signals are outputted to the switch 9c in FIG. 1 from RGB output terminals.

The two (2) color-difference signals R-Y and B-Y are inputted to a balanced modulator 42. The two (2) color-difference signals R-Y and B-Y are modulated by a sub-carrier signal of 3.58 MHz, so that a chroma signal C is generated. The intensity signal Y and the chroma signal C are such that a Y/C signal is outputted to the switch 9b in FIG. 1 from an S-terminal. The chroma signal C and the intensity signal Y are inputted to a mixer 43, and are mixed with each other. The NTSC composite video signal is outputted to the switch 9a in FIG. 1 from a NTSC composite video-signal output terminal.

Figure 3:
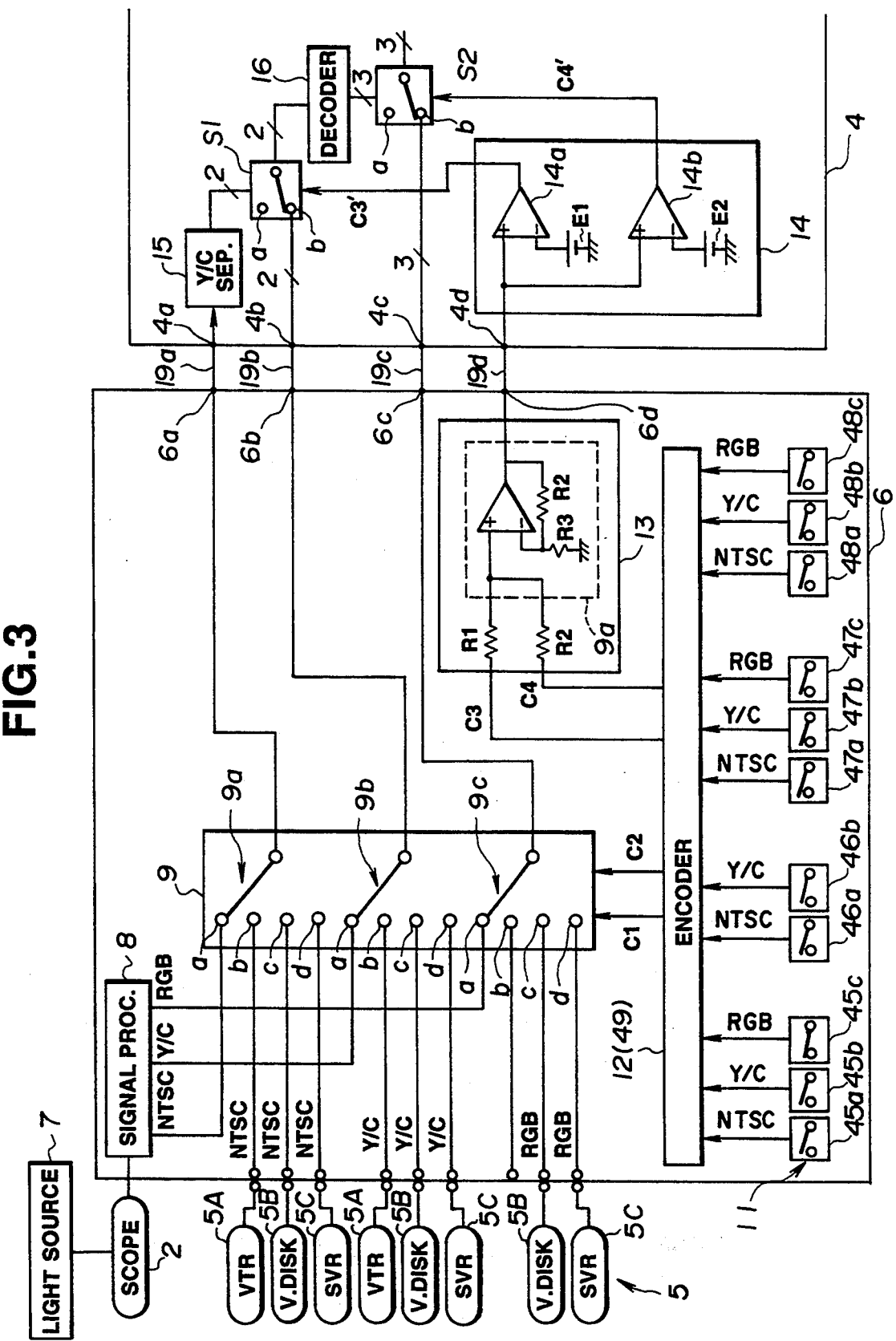

FIG. 3 shows the periphery of the switching operation switch 11 and the switching-signal generating section 12.

The switching operation switch 11 is provided with switches 45a~45c, 46a, 46b, 47a~47c, and 48a~48c correspondingly to the number of switching changing-over of the changing-over switches 9a, 9b and 9c. For example, the number 45 of the switches 45a~45cexpresses a switch for selecting the signal processing circuit 8 (or the endoscope 2). The reference characters a~c are also for selecting the signal modes of the NTSC, the Y/C and the RGB, respectively.

Moreover, the reference numerals 46, 47 and 48 denote switches for selecting the VTR 5A, the V.DISK 5B and the SVR 5C, respectively.

These switches 45a~48c are converted to switching signals C1~C4 which are outputted respectively from four (4) signal lines through a encoder 49. The switching signals C1 and C2 outputted, respectively, from two (2) signal lines which are brought to the high-order side control switching changing-over of the changing-over switches 9a, 9b and 9c, respectively. The switching signals C3 and C4 outputted, respectively, from two (2) signal lines, which are brought to the low-order side, are inputted to the remote-signal generating section 13.

For example, the encoder 49 outputs the switching signals C1 and C2 expressing any of which devices of the signal processing circuit 8 (or the electronic endoscope 2), the VTR 5A, the V.DIS 5BK and the SVR 5C are selected, from the two (2) signal lines, with respect to the switch selected from the switches 45a~48c. Further, the encoder 49 is so converted as to output the switching signals C3 and C4 expressing the signal modes of the selected devices, from two (2) signal lines.

The switching signals C1~C4 transmitted, respectively through the signal lines are binary signals. When, for example, combination of "1" and "0" of the levels of the switching signals C1 and C2 on the side of the high order is "11", "10", "01" and "00", the common contacts of the respective changing-over switches 9a, 9b and 9c are switched such that respective contacts a, b, c and d are turned ON.

At the remote-signal generating section 9, the two (2) switching signals C3 and C4 are weighed different from each other by resistors R1 and R2, and are added to each other by an adder 9a (for example, a resistance value of the resistor R1 is twice the resistor R2). A resistance value of a resistor R3, forming the adder 9a, is set sufficiently smaller than a resistor R2, to output a remote signal of substantially C3*2+C4 to the switching control section 14 from the adder 9a.

The two (2) switching signals C3 and C4 output signals of "10", "01" and "00", for example. In this case, level of the remote signal is brought to 2, 1, 0.

Meanwhile, the switching control section 14 has a pair of comparators 14a and 14b in which reference voltages E1 and E2 are set to levels of 1 and 5, and 0 and 5, respectively. The remote signal passes through the pair of comparators 14a and 14b to produce switching signals C3' and C4'. If the switching signals C3' and C4' are "1", for example, the contact a is turned on, while, if the switching signals C3' and C4' are "0", the contact b is turned on.

The switching signals C3' and C4' control switching of the first and second changing-over switches S1 and S2, respectively.

With the arrangement described above, when, for example, the switch 45c is turned on to perform operation to select the RGB signal of the signal processing circuit 8 (or the endoscope 2), the switching signals C1 and C2 control switching changing-over of the changing-over switches 9a, 9b and 9c so as to select the signal processing circuit 8 (or the electronic endoscope 2) (condition illustrated in FIG. 3).

Further, the switching signals C3 and C4 are brought to "00", and the remote signal is brought to the level of "0". Accordingly, the switching signals C3', and C4', outputted from the switching control section 14, are both brought to "0". As shown in FIG. 3, the first and second changing-over switches S1 and S2 are both such that the contact b is selected. The RGB signal passing through the signal, processing circuit 8, is led to the CRT 18 through the CRT drive circuit 17, and is displayed by the CRT 18.

According to the first embodiment, operation to select the devices and the signal mode from the switching operation switch 11, provided on the video processor 6, is performed whereby switching is made to select the devices which operate the switching section 9 within the video processor 6, and the remote signal is transmitted to the side of the image display apparatus 4 through the remote-signal generating section 13, so that switching control can be made such that the signal mode, selecting the changing-over switches S1 and S2 within the image display apparatus 4, is selected. Accordingly, if the user merely performs operation to select the devices and the signal mode by the change-over switch 11, the corresponding devices and the signal mode are selected and are displayed on the CRT 18.

Accordingly, because such operation can be omitted that switching is performed, manually on the side of the image display apparatus 4 to switching on the side of the video processor 6 and operability is improved. Moreover, it is possible to prevent mistaking false or wrong manual operation from occurring.

Figure 4:
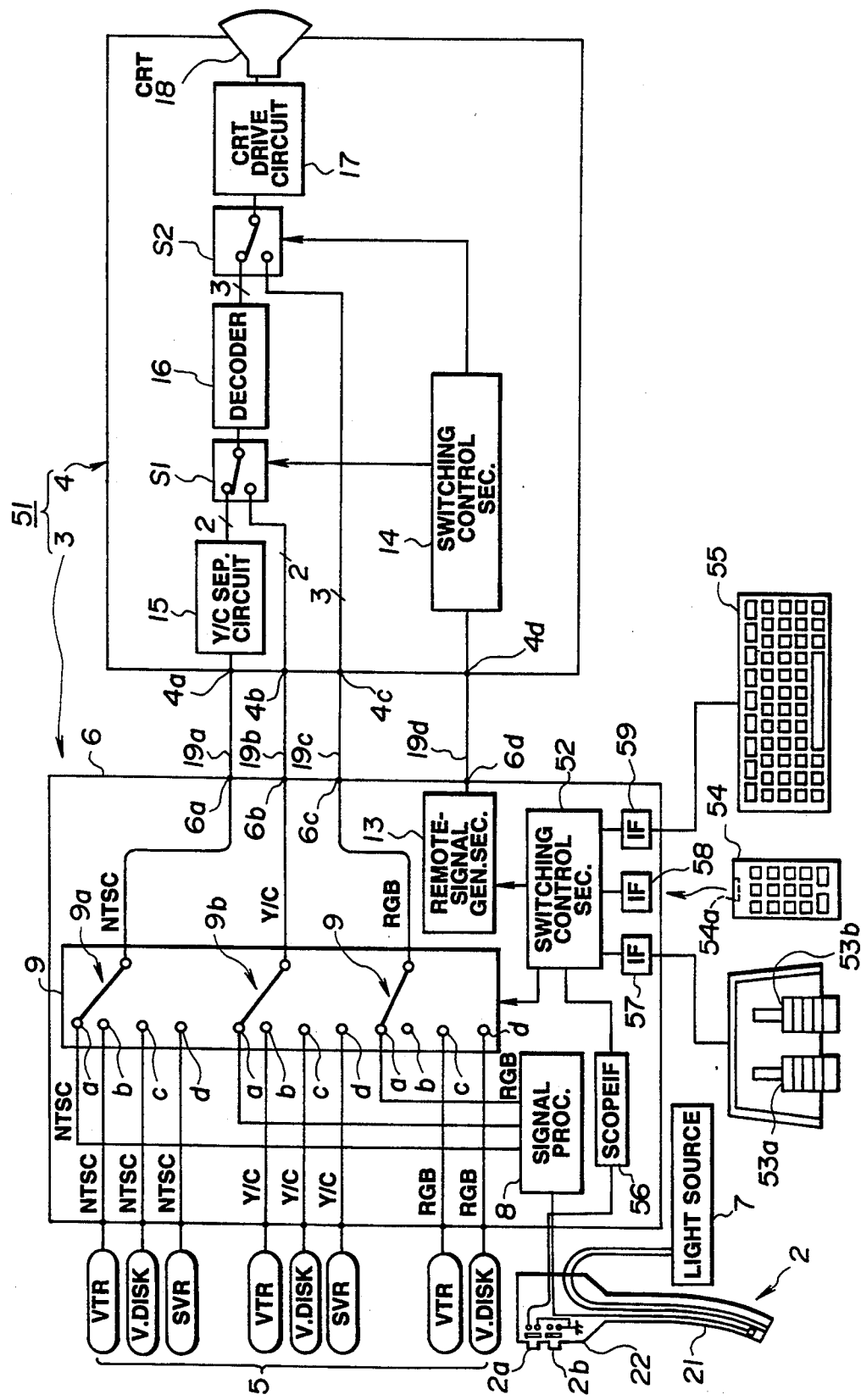
FIGS. 4 and 5 relate to a modification of the first embodiment, FIG. 4 being a block diagram showing an arrangement of an endoscope system according to the modification.

FIG. 4 is a block diagram showing an endoscope system 51 according to a modification of the first embodiment of the invention. In FIG. 1, the modification is provided with a plurality of kinds or types of operations or functions corresponding to the switching operation switch 11 and expands or extends such function as to cope with function of the switching-signal generating section 12.

That is, a switching-signal control section 52, arranged within the video processor 6 forming the endoscope apparatus 3, comprises a pair of changing-over switches 2a and 2b provided on the operating section 22 of the electronic endoscope 2, a pair of foot switches 53a and 53b for performing turning-on and -off by operation stepped on by a foot, a small-sized remote-control device (hereinafter referred to as "remocon") 54 for sending a signal by infrared rays or the like, a keyboard 55 for inputting the signal by key operation, and various elements are connected, respectively, through a scope IF 56, a foot switch IF 57, a remocon IF 58 and a keyboard IF 59.

The remocon 54 has a switch corresponding to the switching operation switch 11, for example. The switch is operated whereby the infrared ray, modulated through a modulator and light-modulated through an infrared-ray LED 54a, is inputted to a light receiving element of the remocon IF 58. At the remocon IF 58, the infrared ray is photoelectrically converted by the light receiving element, and is modulated by the modulator and, subsequently, is converted to a switching signal by the encoder (49, for example).

The keyboard 55 has also function corresponding to the switching operation switch 11. In this case, for example, a key, corresponding to the switching operation switch 11, is operated whereby control can be performed similarly.

Figure 5:
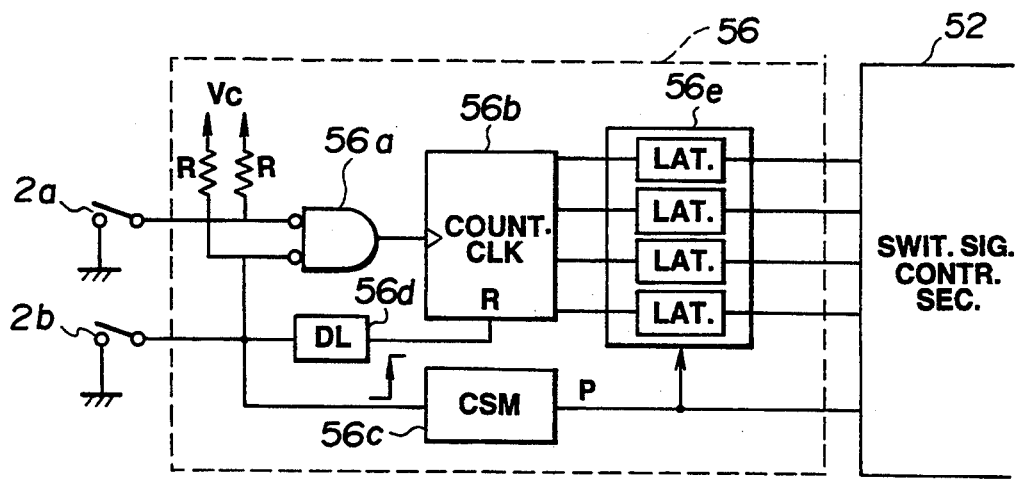

Meanwhile, because the changing-over switches 2a and 2b, provided on the electronic endoscope 2 or the foot switches 53a and 53b, are two (2) switches, the scope IF 56, for example, arranged as illustrated in FIG. 5, are used whereby the endoscope has function corresponding to the switching operation switch 11.

The changing-over switches 2a and 2b are inputted to a clock input end CLK of a counter 56b through an AND gate 56a of negative logic. The AND circuit 56a has a pair of input ends which are pulled-up, respectively, by a pair of resistors R. Furthermore, one of the changing-over switches 2b is inputted to a one-shot multiple vibrator (hereinafter referred to as "OSM") 56c, and is connected to a reset terminal R of the counter 56b through a delay line 56d. The OSM 56c is triggered by an edge transited from "0" to "1" to output a short pulse P.

A calculated or counted value, outputted from an output end of a counter 56b, is inputted to a latch circuit 56e. The counted value is latched to the latch circuit 56e by a leading edge of the pulse P, for example, to output the latched counted value to a switching control section 52. Further, the pulse P is also outputted to the switching control section 52.

The switching control section 52 judges that the pulse P is "1", to discriminate whether or not a signal for performing selection of the devices and the signal mode is inputted, to thereby perform corresponding operation.

A delay line 56d is provided for the purpose that the counter 56b is not reset prior to the fact that the pulse P is outputted.

Operation due to the above-described arrangement is as follows. That is, in a case where the user performs section of the displayed device and signal mode, one of the changing-over switches 2b is turned ON whereby the counter 56b can be set to a counting condition, and the AND gate 56a can be opened (after slight delay).

The other changing-over switch 2a is turned ON/-OFF only by the number of times corresponding to a value corresponding to the desired device and signal mode. The number of ON/OFF times is counted by the counter 56b. Subsequently, the one changing-over switch 2b is turned OFF, whereby the OSM 56c is triggered by the leading edge, and outputs the short pulse P. A counting value of the counter 56b is latched to the latch circuit 56e. Subsequently, the counter 56b is reset.

The counting value latched by the latch circuit 56e is outputted to the switching control section 52, and the switching control section 52 detects that the signal performing selection of the device and the signal mode is inputted by the pulse P, to perform selection of the switching section 9 by the counting value from the latch circuit 56e.

In connection with the above, correspondence between the number of times, and the device and the signal mode should be such that 1~11 correspond to the switches 45a~48c illustrated in FIG. 3, for example.

According to the present modification, the user operates switching operation means which is the easiest in operation, from a plurality of switching operation means, whereby it is possible to display an endoscope image on the CRT 18 by the desired device and signal mode. The other has advantages similar to those of the first embodiment.

Figure 6:
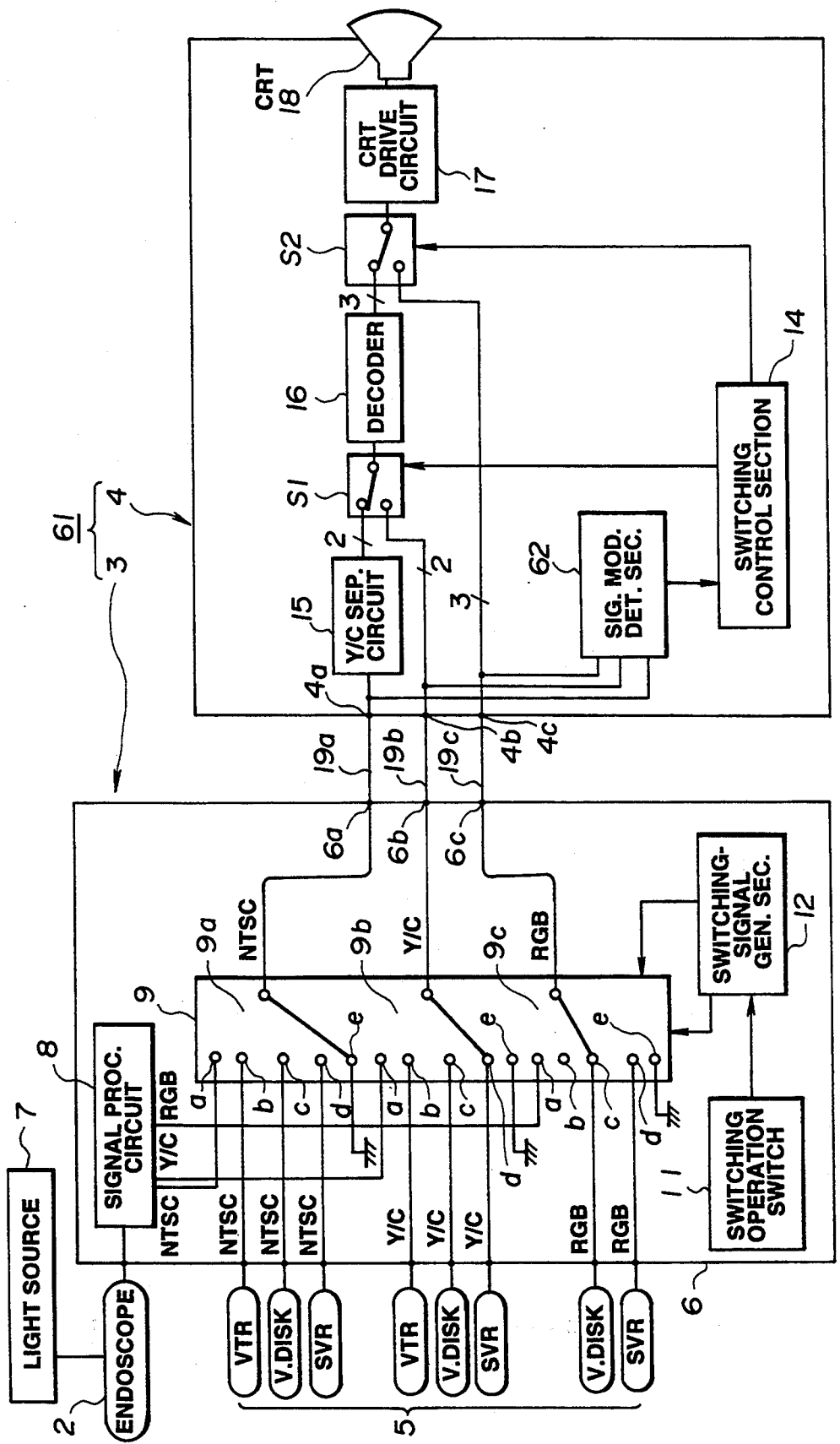

FIG. 6 shows an endoscope system 61 according to a second embodiment of the invention.

In the first embodiment, the switching section 9, within the video processor 6, is switched by switching operation of the switching operation switch 11 of the video processor 6, and the remote signal, on the basis of the switching operation, is transmitted to the switching control section 14 of the image display apparatus 4, to thereby control the changing-over switches S1 and S2 within the image display apparatus 4.

In the second embodiment, the remote-signal generating section 13 is neglected and, in place thereof, the arrangement is as follows. That is, a signal-mode detecting section 62 is provided for detecting a mode of an image signal (whether the signal is a composite signal, a Y/C signal and an RGB signal) inputted to an image display apparatus 4. By the signal-mode detecting section 62, a mode of the image signal, selected by the side of the video processor 6 and inputted to the image display apparatus 4, is detected.

The embodiment is arranged such that switching signals C3 and C4 outputted to the remote-signal generating section 13 in the first embodiment are outputted to a switching section 9. That is, a switching-signal generating section 12 within a video processor 6 outputs switching signals C1~C4 of four (4) bits to the switching section 9, to perform selection of the device and selection of the signal mode. Change-over switches 9a, 9b and 9c, which cooperate with each other to form the switching section 9, have contacts e which are connected to GND. Only one of the changing-over switches 9a, 9b and 9c selects any of the contact a~c which perform selection of the device and the mode, while the remaining two (2) changing-over switches are connected to the contact e.

Accordingly, only one (one or three (3) signal lines) of transmitting cables 19a, 19b and 19c, connected, respectively, to common contacts of the respective changing-over switches 9a, 9b and 9c in fact transmits a signal. The remaining two (2) transmitting cables do not transmit the signal, but are connected to GND.

The signal-mode detecting section 62 detects a signal level of the transmitting cables 19a, 19b and 19c, to detect to what transmitting cable 19$i$ ($i$=a, b, or c) the signal is transmitted. The signal-mode detecting section 62 outputs a detecting signal corresponding to the transmitting cable 19$i$ which transmits the signal, to the switching control section 14.

A switching control section 14 controls switching of a pair of first and second changing-over switches S1 and S2 such that the transmitting cable 19$i$ which transmits the signal is selected.

Figure 7:
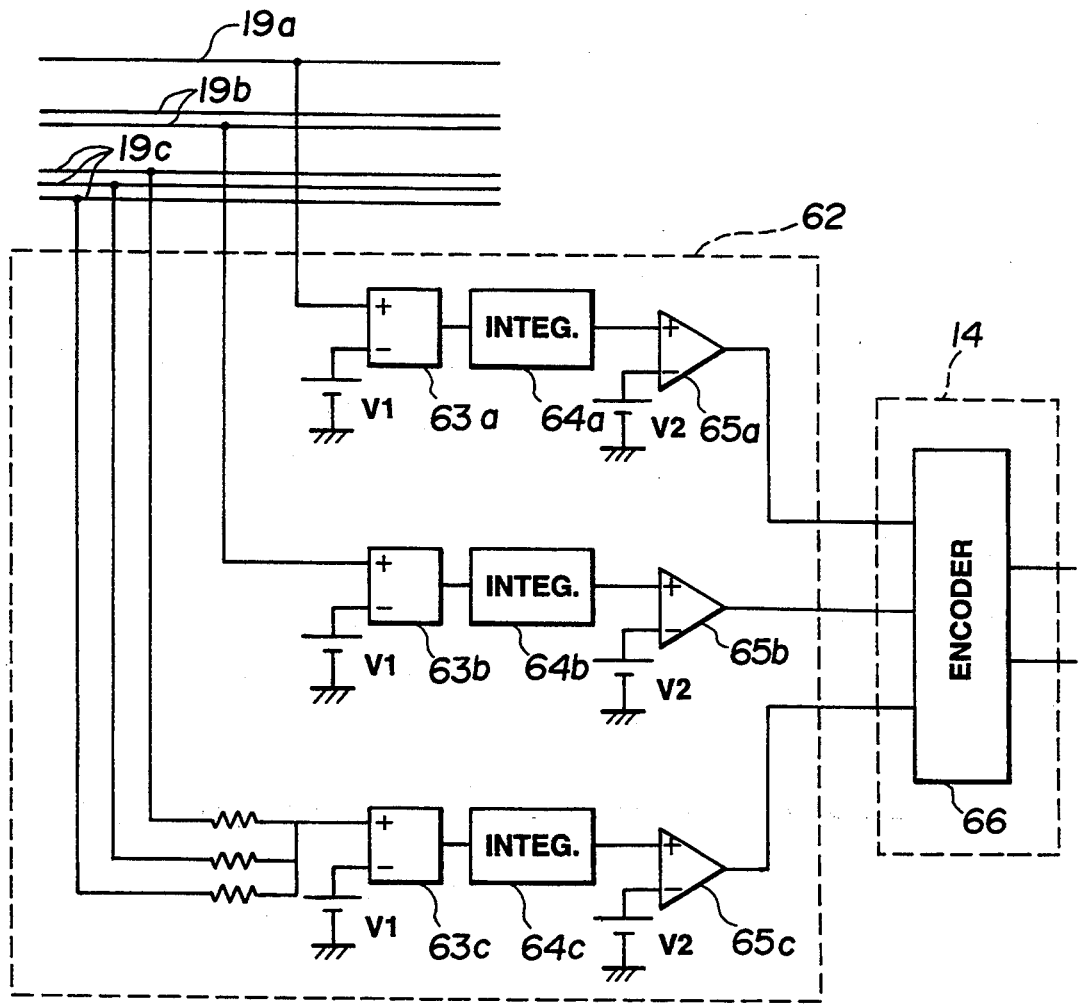
FIGS. 6 and 7 relate to a second embodiment of the invention, FIG. 6 being a block diagram showing an arrangement of an endoscope system according to the second embodiment.

An arrangement example of the signal-mode detecting section 62 is shown in FIG. 7.

The signal of the transmitting cable 19$a$ is inputted to a subtracter 63$a$ so that a reference voltage V1 is subtracted. The reference voltage V1 is a value slightly larger than zero, and removes affection or influence of noises.

An output from the subtracter 63$a$ is integrated by an integrator 64$a$. An output from the integrator 64$a$ is inputted to a comparator 65$a$, and is compared with a reference voltage V2. The reference voltage V2 is a value slightly larger than zero, and detects whether or not there exists a signal, without subjecting an influence or affection of the noises. If there is the signal, an output from the comparator 65$a$ is brought to "1", while, if there is no signal, the output from the comparator 65$a$ is brought to "0".

The output from the comparator 65$a$ is inputted to an encoder 66 which forms the switching control section 14.

Similarly, a signal of an intensity-signal transmitting line of the transmitting cable 19$b$ is inputted to a subtracter 63$b$ so that a reference voltage V1 is subtracted. The output from the subtracter 63$b$ is inputted to a comparator 65$b$ through an integrator 64$b$, and is compared with a reference voltage V2. The output from the comparator 65$b$ is inputted to the encoder 66.

Further, the signals of the transmitting cable 19$c$ are added to each other by a resistor and are inputted to a subtracter 63$c$ so that a reference voltage V1 is subtracted. An output from the subtracter 63$c$ is inputted to a comparator 65$c$ through an integrator 64$c$, and is compared with a reference voltage V2. The output from the comparator 65$c$ is inputted to the encoder 66.

The encoder 66 generates a switching signal the same as that of the first embodiment, for example, from three (3) signals.

It is assumed that the user selects the display at the RGB signal by V.DISK of the video processor 6 in FIG. 6, for example. Then, the signal-mode detecting section 62, within the image display apparatus 4, detects that only the RGB signal of the V.DISK is outputted from the video processor 6. The switching control section 14 switches the first and second changing-over switches S1 and S2 such that the RGB signal is selected.

According to the present embodiment, the signal cable is not required, or is dispensed with, for transmitting the remote signal to the video processor 6 and the image display apparatus 4. The other has advantages similar to those of the first embodiment.

Figure 8:
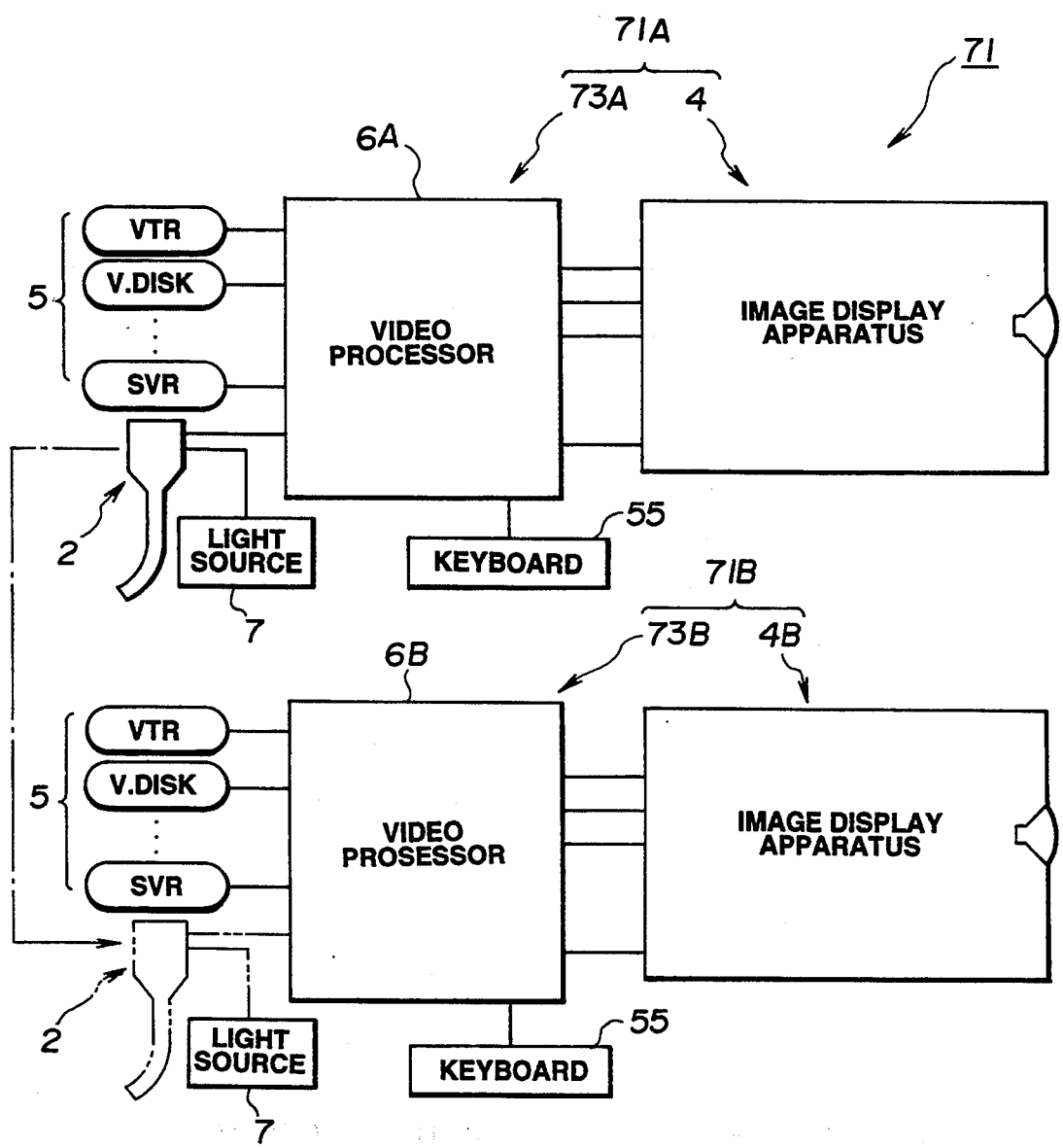
FIGS. 8 to 10 relate a third embodiment of the invention, FIG. 8 being a block diagram showing the entirety of an endoscope system according to the third embodiment of the invention.

FIG. 8 shows the entirety of an endoscope system 71 according to a third embodiment of the invention. The endoscope system 71 uses a common electronic endoscope 2 so as to be able to arrange a first endoscope system 71A and to arrange a second endoscope system 71B.

Figure 10:
Figure 10:
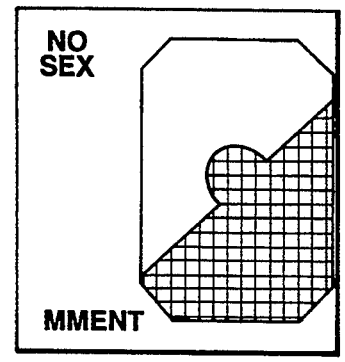

The first endoscope system 71A uses an endoscope apparatus 73A which has a video processor 6A substantially similar to the arrangement from which the foot switches 53$a$ and 53$b$ and the remocon 54 are removed in the endoscope system 51 illustrated in FIG. 4, for example. The arrangement is such that a keyboard 55 can control a switching section 9 by key input, and comments, or the like can be displayed on a CRT 18 through a signal processing circuit 8, by the key input (refer to FIG. 10$a$).

Figure 9:
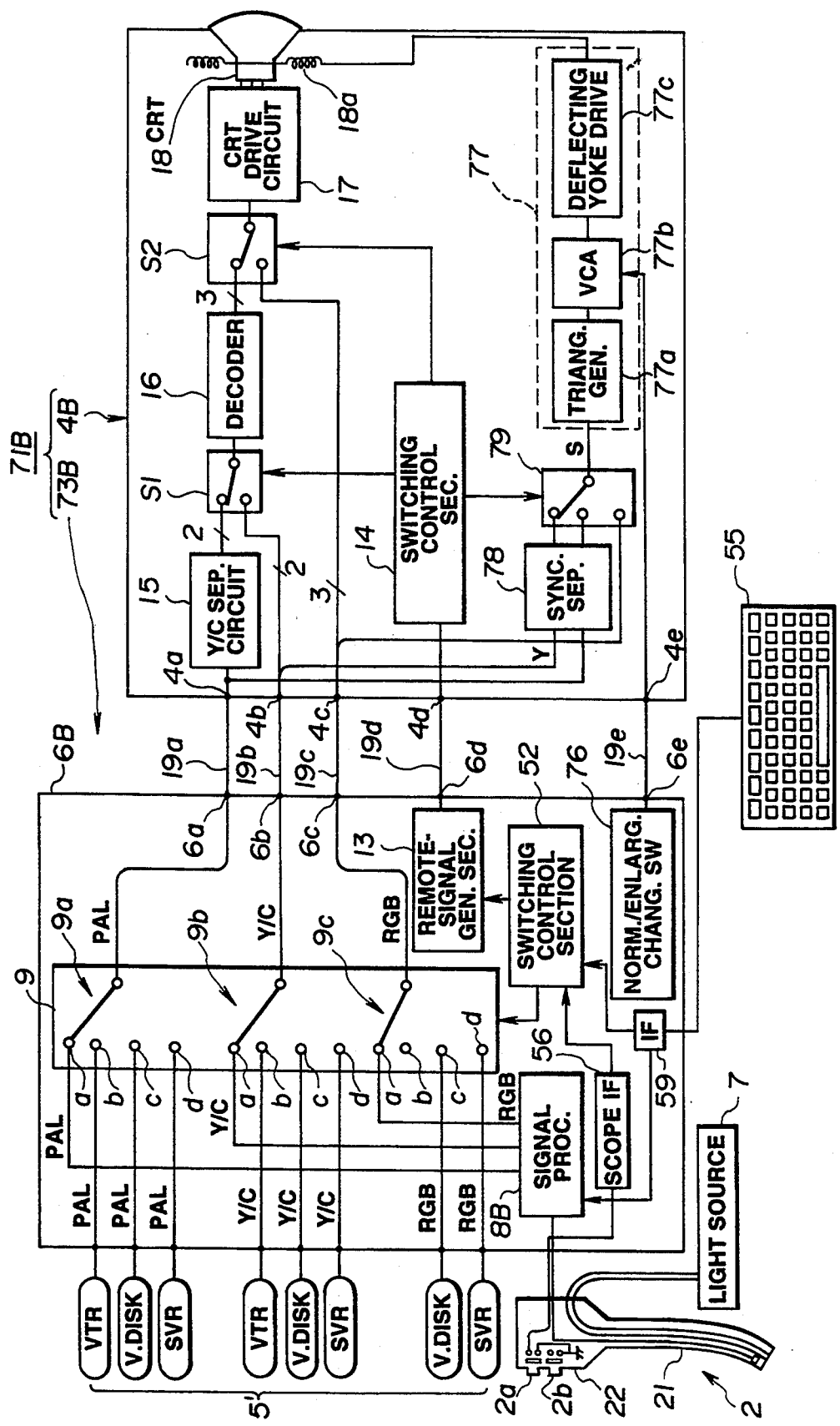

As shown in FIG. 9, the second endoscope system 71B has an endoscope apparatus 73B which uses the video processor 6B, using a signal processing circuit 8B for PAL, in place of the signal processing circuit 8, in the endoscope apparatus 73A. Further, a VTR, or the like, uses endoscope peripheral devices 5' for PAL.

Moreover, in the second endoscope system 71B, an image display apparatus 4B for PAL is used.

As shown in FIG. 9, in a case where a electronic endoscope 2 for NTSC is used to form the endoscope system 71B for PAL, if an endoscope image is displayed on a CRT 18 by an image signal of PAL system, the endoscope image is brought to an endoscope image (refer to FIG. 10$b$) which is displayed in dimension of about 5/6 as compared with the endoscope image (refer to FIG. 10$a$) displayed on the CRT 18 by an image signal of NTSC system.

For this reason, as shown, for example, in FIG. 9, the video processor 6B is provided with a normal/magnification or enlargement changing-over switch 76. A signal in which the switch 76 is turned ON or OFF is inputted to a deflection switching section 77, within a signal input end 4$e$ of the image display apparatus 4B from a signal output end 6$e$ of the video processor 6B through a signal line 19$e$.

A serration-like deflection drive signal is generated on the deflection switching section 77 in synchronism with a synchronous signal which is inputted through a synchronous separation circuit 78 and a switch 79.

A composite signal and an intensity signal Y of a Y/C separation signal are inputted to the synchronous separation circuit 78, to extract the synchronous signals to thereby guide the synchronous signals to the switch 79. A synchronous signal of the RGB signal is also inputted to the switch 79. A synchronous signal S selected by a switching control section 14 is inputted to the deflection switching section 77. Regarding the RGB signal, the synchronous signal thereof is directly applied to the switch 79, because the synchronous signal is a line which has already been separated from the RGB signal.

The deflection switching section 77 comprises a serration-like wave generating circuit 77$a$ for generating a serration-like wave in synchronism with the synchronous signal S, a voltage control amplifier 77$b$ for amplifying the serration-like wave, and a deflection yoke drive circuit 77$c$ for applying a deflection yoke drive signal to a deflection yoke 18$a$ of the CRT 18 by an output signal from the amplifier 77$b$. A binary signal, corresponding to normal/enlargement switching from the normal/enlargement changing-over switch 76, is applied to the voltage control amplifier 77$b$. In a case where, for example, the switch 76 is turned OFF, a signal of "0" is applied to the voltage control amplifier 77$b$ and is maintained to a certain gain G. In a case where the switch 76 is turned ON, a signal of "1" is applied to the voltage control amplifier 77$b$. In this case, the signal of "1" is set to a gain of substantially 6G/5.

Accordingly, in a case where the switch 76 is turned ON, an amount of deflection of the electronic beam is enlarged so that the CRT display image is switched to enlargement display. In a case where the switch 76 is turned OFF, the CRT display image is displayed in a normal amount of deflection.

As a system of television, two (2) kinds of PAL and NTSC systems are typical. Also in the endoscope system, these two kinds are used widely. Normally, in order to produce the same screen or picture-plane size by the picture-plane display unit, solid-state image pickup elements different in the number of pixels from each other respectively in PAL system and NTSC system must be used. In this case, however, endoscopes of NTSC system and PAL system different in the number of pixels from each other must be prepared. The cost will be taken more than the necessity.

In view of the above, it is considered that image signals of both NTSC system and PAL system are produced from a single kind of endoscope. In this case, however, there are many the number of horizontal scanning lines for PAL system as compared with NTSC system. Accordingly, the image is brought to an image which is reduced about 5/6 in a case where display is performed on a display unit by signal processing of PAL system, as compared with a case where display is performed on a display unit by signal processing of NTSC system.

In order to eliminate such a disadvantage that the image display size is diminished or small-sized in this manner, it is considered that a memory and an image interpolation circuit are used, and an image stored in the memory is processed in interpolation to generate an enlarged image. However, interpolation of 6/5 times is technically difficult, and a circuit is complicated. In addition, the image becomes notched or indented. Thus, there is a case where an image quality is reduced rather or on the contrary. Furthermore, time is taken for interpolation processing, and it becomes difficult to perform display at a real time.

For this reason, in the present embodiment, as described previously, an amount of deflection of the beam is made variable on the side of the image display unit 4B, whereby function capable of displaying, in enlargement (the dimension the same as the display due to the signal of NTSC system, if enlargement is made to 6.5 times), a signal of the PAL system without injuring of an image quality further with a simple arrangement is realized.

Figure 11:
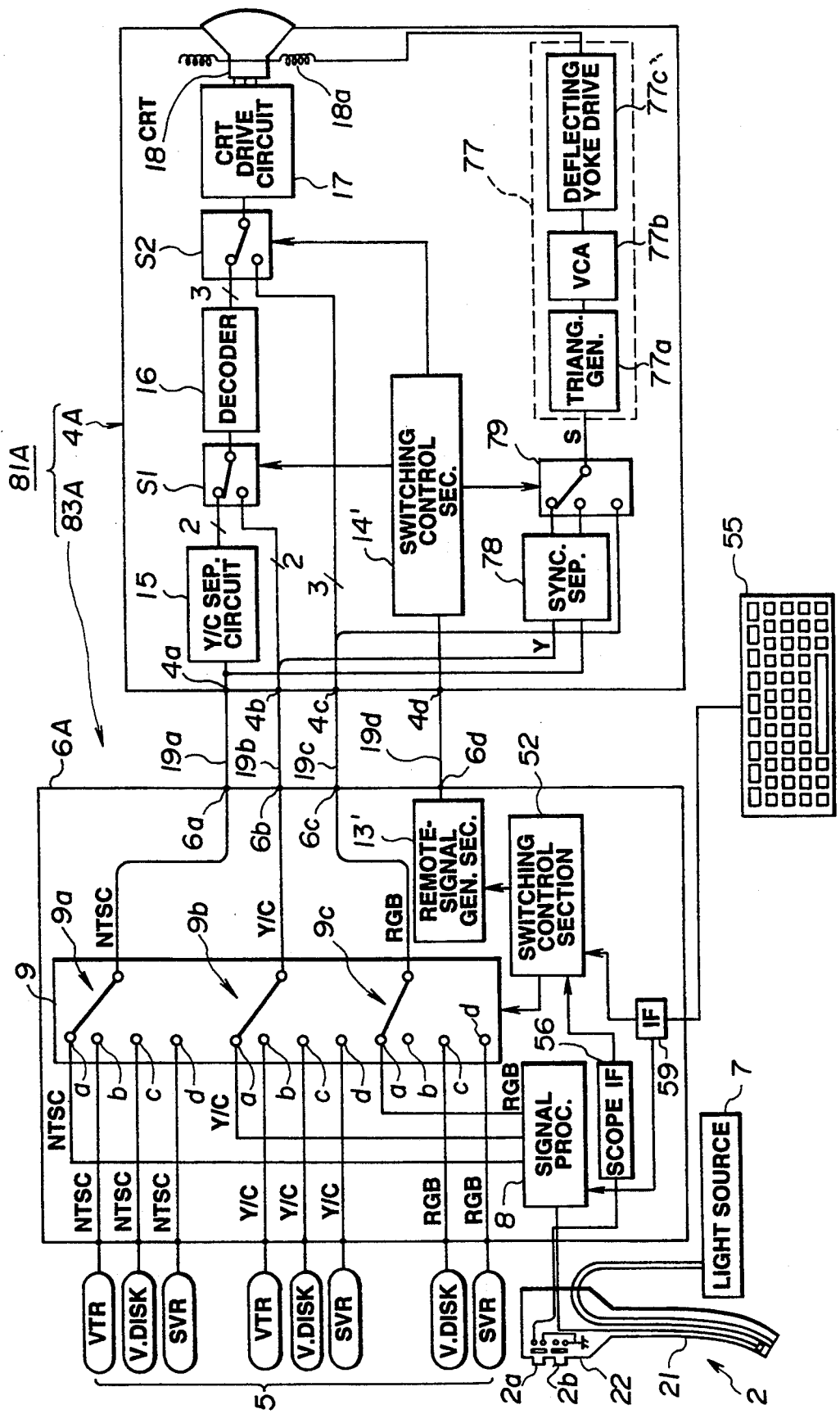
FIG. 11 is a block diagram showing an endoscope system according to a first modification of the third embodiment of the invention.

FIG. 11 shows an endoscope system 81A according to a first modification of the third embodiment. The endoscope system 81A is so arranged as to change the size of the image displayed on the CRT 18 to normal/enlargement/reduction in the endoscope system 71A shown in FIG. 8. In the system 71B, illustrated in FIG. 9, an endoscope apparatus 83A in which the peripheral devices 5 such as the signal processing unit 8, a VTR and the like for NTSC are used in place of PAL. Further, the image unit 4A has an arrangement thereof similar to the image display apparatus 4B illustrated in FIG. 9.

Moreover, in the present modification, the switch 76, shown in FIG. 9, is not provided, but is capable of being operated by the switches 2a and 2b of the electronic endoscope 2, and is also capable of being operated by the keyboard 55. For example, in a case where the switches 2a and 2b are operated to perform ON/OFF twelve (12) times, a signal of normal operation can be outputted to the switching control section 52 through the scope IF 56. In a case where ON/OFF is performed thirteen (13) times, a signal of enlargement operation can be outputted to the switching control section 52 through the scope IF 56. In a case where ON/OFF is performed fourteen (14) times, a signal of reduction operation can be outputted to the switching control section 52 through the scope IF 56.

The switching control section 52 generates a signal of, for example, two (2) bits through the encoder from these operation signals. A size changing, or modification, signal is transmitted to the switching control section 14' through the signal line 19f and through the remote-signal generator 13' which uses an additional one set of the adder 9a, and the like, illustrated in FIG. 3. The switching control section 14' demodulates a transmitted size modification signal by a decoder, and outputs the demodulated signal to the voltage control amplifier 77b of the deflection switching section 77.

At the voltage control amplifier 77b, gain is modified by signals of three (3) levels. An endoscope image displayed on the CRT 18 is displayed by size of reduction/normal/enlargement.

According to the present modification, it is possible to display the endoscope image by normal size. For example, in a case where an arrangement having many the number of pixels for PAL is used as the electronic endoscope 2, reduction operation is performed, whereby it is also possible to display the arrangement by size similar to normal size.

Furthermore, also in a case where size displayed in accordance with a case where there are many the number of pixels of the CCD, a case where there are less the number of pixels of the CCD, or the like is changed, operation of reduction or enlargement is performed whereby it is also possible to prevent the size from largely changing from normal size.

Conversely, also in a case where an arrangement which is the same as the number of pixels as each other is used, changing or modification can also be made in accordance with the display size of the CRT 18. In a case where the CRT 18 is installed on a remote location, enlargement operation is performed whereby observation can also be made up to detailed parts.

Figure 12:
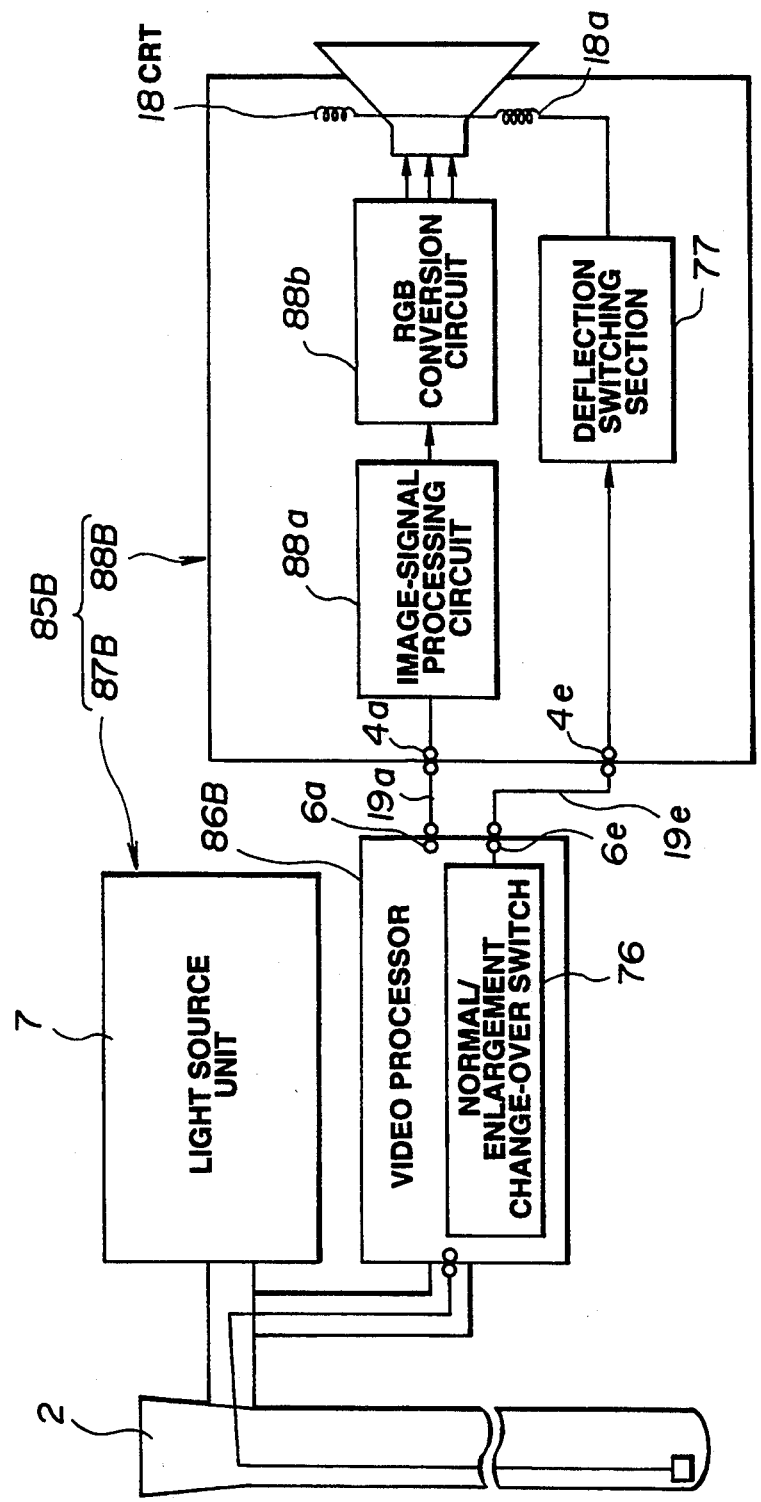
FIG. 12 is a block diagram showing an endoscope system according to a second modification of the third embodiment of the invention.

FIG. 12 shows an endoscope system 85B according to a second modification of the third embodiment. The endoscope system 85B is arranged such that, in the endoscope apparatus 73B in, for example, FIG. 9, a video processor 86B, having no peripheral devices 5', is used to form the endoscope apparatus 87B.

The video processor 86B outputs an image signal of only a composite signal of PAL, for example, from the signal output end 6a to the signal input end 4a of an image display apparatus 88B through the cable 19a. The image signal inputted from the signal input end 4a, is Y/C-separated through an image-signal processing circuit 88a provided with a Y/C separation circuit, or the like, and, subsequently, is inputted to an RGB conversion circuit 88b and is converted to an RGB signal. The RGB signal is applied to the CRT 18, and is displayed on the CRT 18.

Further, the video processor 86B has the normal/enlargement changing-over switch 76 illustrated in FIG. 9. A normal/enlargement changing-over signal is applied to the second signal input end 4e of the image display apparatus 88B from a second signal output end 6e through the signal line 19e. The signal applied to the signal input end 4e is applied to the deflection yoke 18a of the CRT 18 through the deflection switching section 77.

The present modification has function and advantages similar to those of the third embodiment, regarding modifying or changing function of a displayed image size.

Figure 13:
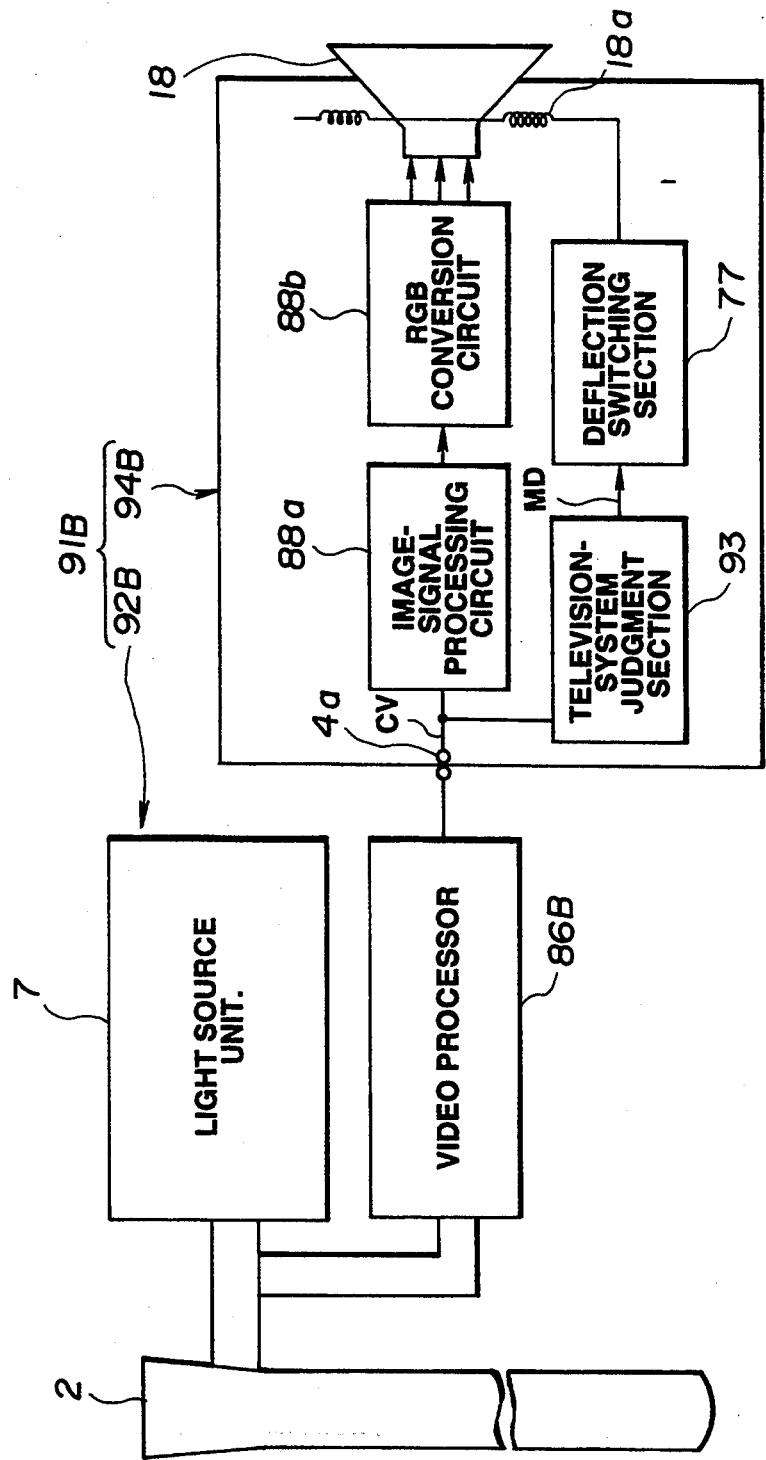
FIG. 13 is a block diagram showing an endoscope system according to a third modification of the third embodiment of the invention.

FIG. 13 shows an endoscope system 91B according to an another modification regarding enlargement of a displayed image.

The present modification comprises an endoscope apparatus 92B provided with no normal/enlargement changing-over switch 76 on the video processor 86B in FIG. 12, and an image display apparatus 94B provided with a television-system judgment section 93 whether of PAL system or of NTSC system, on an image display apparatus 88B.

A signal input end of the judgment section 93 is connected to the signal input end 4a of the image display apparatus 94B, and an output end of the judgment section 93 is connected to the deflection switching section 77.

Figure 14:
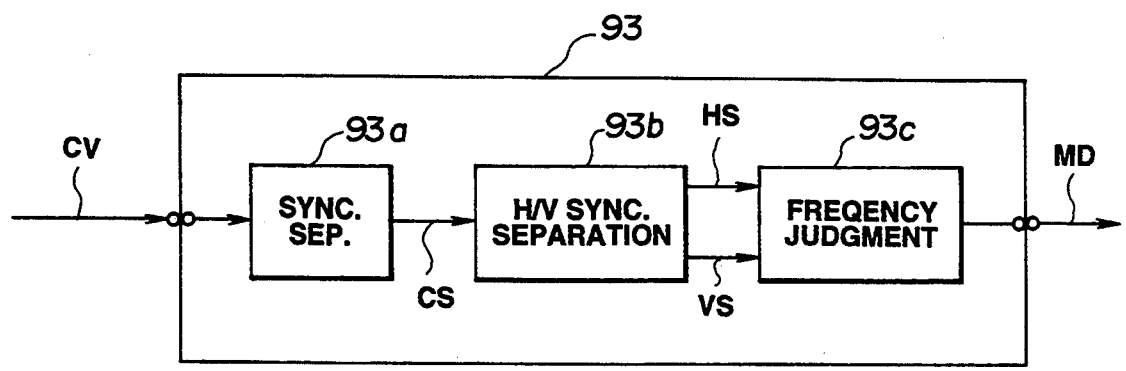
FIG. 14 is a block diagram showing an arrangement of a television-system discriminating section.

An arrangement of the television-system judgment section 93 is shown in FIG. 14. A composite signal CV, inputted from the signal input end 4a, is removed in an image portion by a synchronous separation circuit 93a, and the composite synchronous signal CS is extracted. The composite synchronous signal CS is inputted to a horizontal/vertical synchronous separation circuit 93b.

The composite synchronous signal CS is separated into a horizontal synchronous signal HS and a vertical synchronous signal VS by the horizontal/vertical synchronous separation circuit 93b. The two (2) synchronous signals are inputted to a frequency judgment circuit 93c which is formed by, for example, a counter and the like. It is judged that the two (2) signals are a signal of PAL or a signal of NTSC from the number of horizontal synchronous signals, within a time between adjacent vertical synchronous signals VS. A mode detecting signal MD corresponding to a judged signal mode is outputted from the frequency judgment circuit 93c.

For example, in a case where it is judged as being a signal of NTSC, a signal of "0" is outputted to the deflection switching section 77 as a mode detecting signal MD. In a case where it is judged as being a signal of PAL, a signal of "1" is outputted to the deflection switching section 77 as the mode detecting signal MD. The deflection switching section 77 is arranged such that a deflection condition is switched by a level of the inputted mode detecting signal MD. In a case of an input signal of "0", an image is displayed under a normal deflection condition, while, in a case of an input signal of "1", an image is displayed in enlargement under a large deflection condition.

Accordingly, according to the present modification, the deflection switching portion 77 is switched in accordance with a television system (whether PAL system?, or NTSC system?) of the image signal inputted to the image display apparatus 94B. In a case of the signal of the NTSC system, an image is displayed on the CRT 18 as it is. In a case of the signal of the PAL system, the image is enlarged (6/5 times, for example) and is displayed on the CRT 18.

Figure 15:
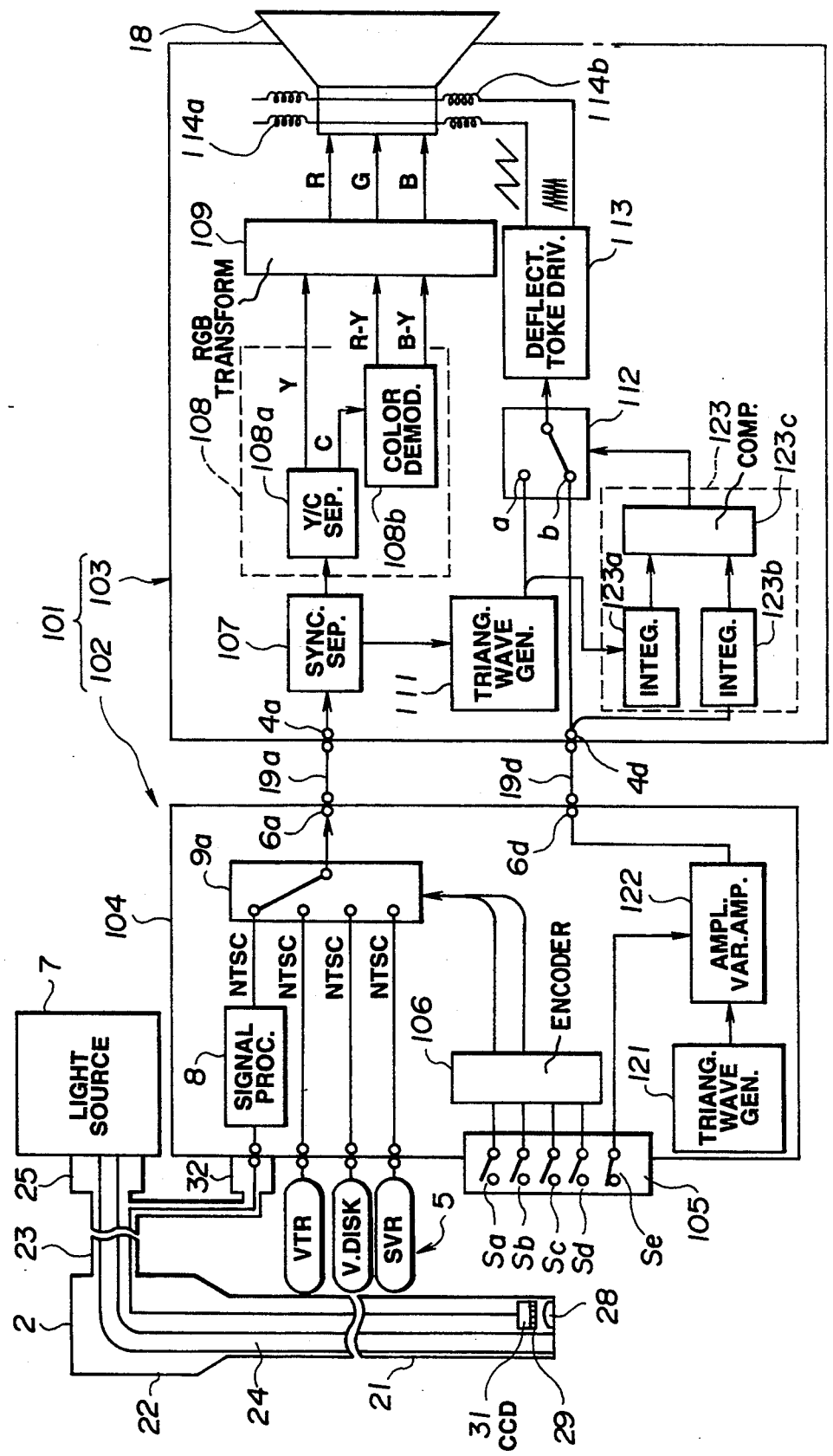
FIG. 15 is a block diagram showing an endoscope system according to a fourth embodiment of the invention.

FIG. 15 shows an endoscope system 101 according to a fourth embodiment of the invention.

The endoscope system 101 comprises an endoscope apparatus 102 and an image display apparatus 103. The endoscope apparatus 102 comprises an electronic endoscope 2, a light source unit 7, a video processor 104 and endoscope peripheral devices 5. The electronic endoscope 2 and the light source unit 7 are the same in arrangement as those in FIG. 2.

Moreover, the video processor 104 has a signal processing circuit 8 which performs signal processing with respect to a CCD 31 of the electronic endoscope 2, and a changing-over switch 9a for selecting a composite signal of NTSC system of the signal processing circuit 8 and a composite signal of NTSC system from the endoscope peripheral devices 5.

The changing-over switch 9a turns on switches Sa~Sd provided on, for example, a front panel 105, whereby a signal of the signal processing circuit 8 or a device corresponding to a switch which is turned ON through an encoder 106 is selected. A selected signal is inputted to the image display apparatus 103.

The image signal selected by the changing-over switch 9a is inputted to a synchronous separation circuit 107 within the image display apparatus 103. Vertical and horizontal synchronous signal components are extracted. The synchronous signal is inputted to a triangular-wave (serration-like wave) generating circuit 111. The image signal, from which the synchronous signal component is removed, is inputted to a Y/C separation circuit 108a which forms an image-signal processing circuit 108, and is separated into an intensity signal Y and a chroma signal C.

The chroma signal C is inputted to a color demodulation circuit 108b, and is demodulated by the use of a subcarrier. Color difference signals R-Y and B-Y are generated and are inputted to an RGB conversion circuit 109 together with the intensity signal Y. Thus, an RGB signal is generated. The RGB signal is inputted to a CRT 18 to color-display an endoscope image corresponding to an image signal.

Figure 16A:
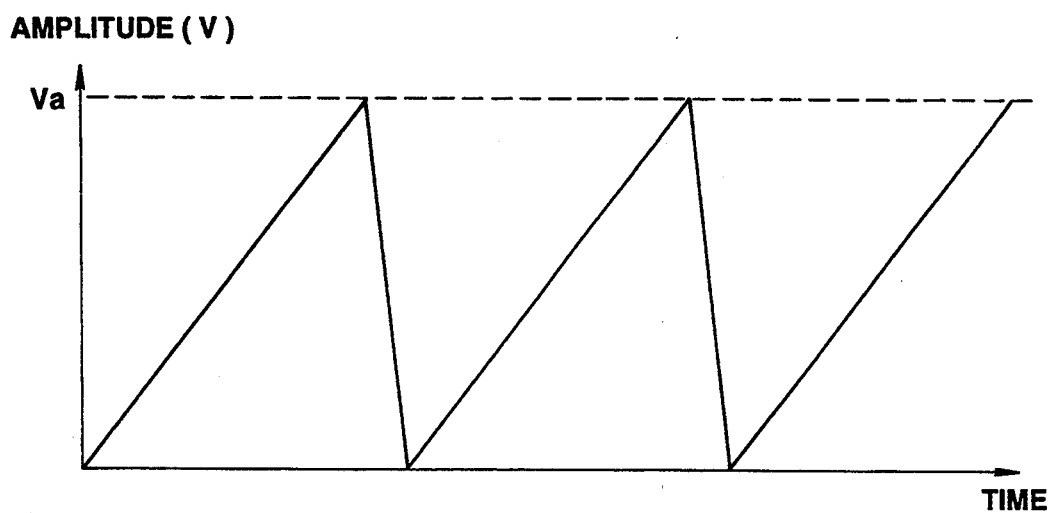
FIGS. 16a and 16b are waveform views showing a deflection-yoke drive signal in a case of normal and enlarged display sizes.

The vertical and horizontal synchronous signals, separated from each other by the synchronous separation circuit 107, are inputted to the triangular-wave generating circuit 111, to generate a triangular wave of a constant amplitude Va as shown in FIG. 16a. Only a single wave is shown in FIG. 16a. In fact, however, the triangular-wave generating circuit 111 generates an triangular wave (that is, 60 Hz) of frequency in synchronism with the vertical synchronous signal, and a triangular wave (that is, 15750 Hz) of frequency in synchronism with the horizontal synchronous signal.

The triangular wave of the triangular-wave generating circuit 111 is inputted to a deflection yoke drive circuit 113 through a changing-over switch 112. The triangular wave of the triangular-wave generating circuit 111 is amplified in current and is brought to a vertical deflection yoke drive signal and a horizontal deflection yoke drive signal. The vertical deflection yoke drive signal and the horizontal deflection yoke drive signal are applied to a vertical deflection yoke 114a and a horizontal deflection yoke 114b, respectively. An electron beam which impinges against a fluorescent surface is scanned two-dimensionally by these drive signals. An area which is scanned two-dimensionally is brought to a display area of the image such as an endoscope image or the like. The changing-over switch 112 is brought to a normal display size under a condition that a contact a is turned ON.

The front panel 105 is provided with a display-mode selecting switch Se which performs operation to select display at normal size and enlarged display. If the display-mode selecting switch Se is turned OFF, the changing-over switch 112 within the image display apparatus 103 is arranged such that the contact a is turned ON so that display is performed at normal size, while, when the display-mode selecting switch Se is turned ON, the mode is brought to a mode which performs enlarged display.

The video processor 104 has therein a triangular-wave generating circuit 121 for generating a triangular wave for performing enlarged display. The triangular-wave generating circuit 121 generates a triangular wave of amplitude Va which is the same as that in the triangular-wave generating circuit 111 within the image display apparatus 103. The triangular wave generated by the triangular-wave generating circuit 121 is inputted to an amplitude variable amplifier 122.

Figure 16B:
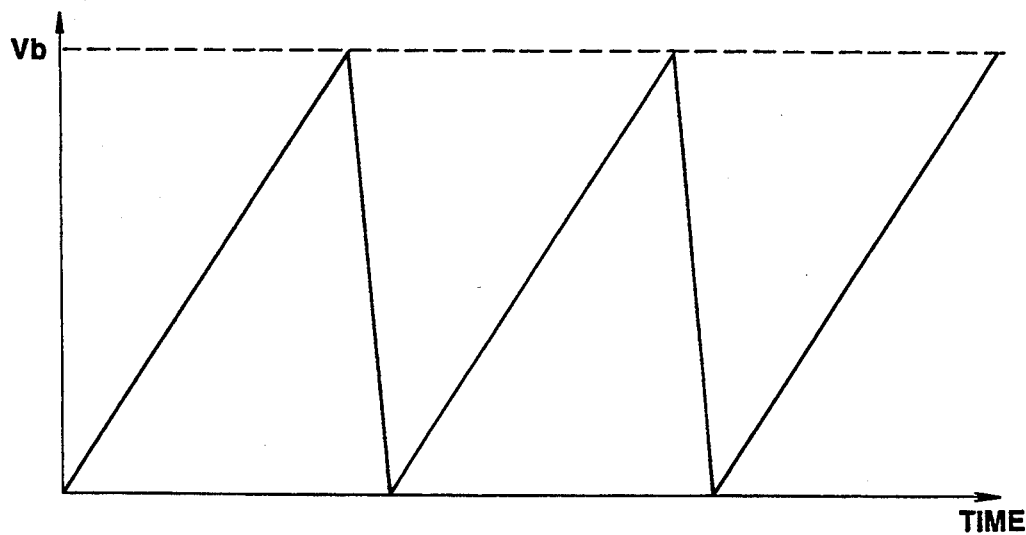

The amplitude variable amplifier 122 is formed by, for example, a VCA. A gain is changed in accordance with a signal level which is applied to a control end. When the switch Se is turned ON, a signal level applied to the control end is brought to "1" so that the gain is brought to 6/5, for example. In this case, if the triangular wave inputted to the amplitude variable amplifier 122 is one shown in FIG. 16a, a triangular wave of amplitude Vb as illustrated in FIG. 16b is outputted.

Meanwhile, if the switch Se is turned OFF, the signal level becomes "0". The gain of the amplitude variable amplifier 112 becomes 1. Thus, the inputted triangular wave is outputted without the fact that amplitude varies or changes.

The triangular wave, outputted from the amplitude variable amplifier 122, is applied to a contact b of the changing-over switch 112 within the image display apparatus 103, and is inputted to an integration circuit 123b which forms the switch changing-over circuit 123. Moreover, the triangular wave of the triangular-wave generating circuit 111 is also inputted to an integration circuit 123a. In this connection, the triangular waves for vertical deflection and for horizontal deflection are applied respectively, to the contacts a and b of the switch changing-over circuit 123. One of the triangular waves (a triangular wave for horizontal deflection, for example) is inputted to the integration circuits 123a and 123b.

A signal integrated by the integration circuits 123a and 123b is inputted to a comparator 123c. The comparator 123c issues a switching signal which changes over the switch 112 if a signal of the integration circuit 123b is larger than a signal of the integration circuit 123a, which serves as a standard or reference.

That is, the switch 112 is so set that the contact a is normally turned ON. Under the condition, if a display-mode selecting switch Se is turned ON as shown in FIG. 15, because the triangular wave outputted from the amplitude variable amplifier 122 becomes larger than the triangular wave of the triangular-wave generating circuit 111 within the image display apparatus 103, the switch changing-over circuit 123 performs such switching that the contact b is turned ON. In this case, because a drive signal, having amplitude larger than that under the normal condition, is applied to the deflection yokes 114a and 114b, the scanning area increases, and display is performed larger than the normal display size. For example, in a case where the normal display is one shown in FIG. 10a, if the display-mode selecting switch Se is turned ON, enlarged display is performed as shown in FIG. 10b.

According to the present embodiment, the image display apparatus 103 can be used similarly to an existing image display apparatus under the normal using condition. Furthermore, the switch 112 and the switch changing-over circuit 123 are provided in front of the deflection yoke drive circuit 113, whereby it is possible to realize image display means in which it is possible to perform display of enlarged and normal images.

Figure 17:
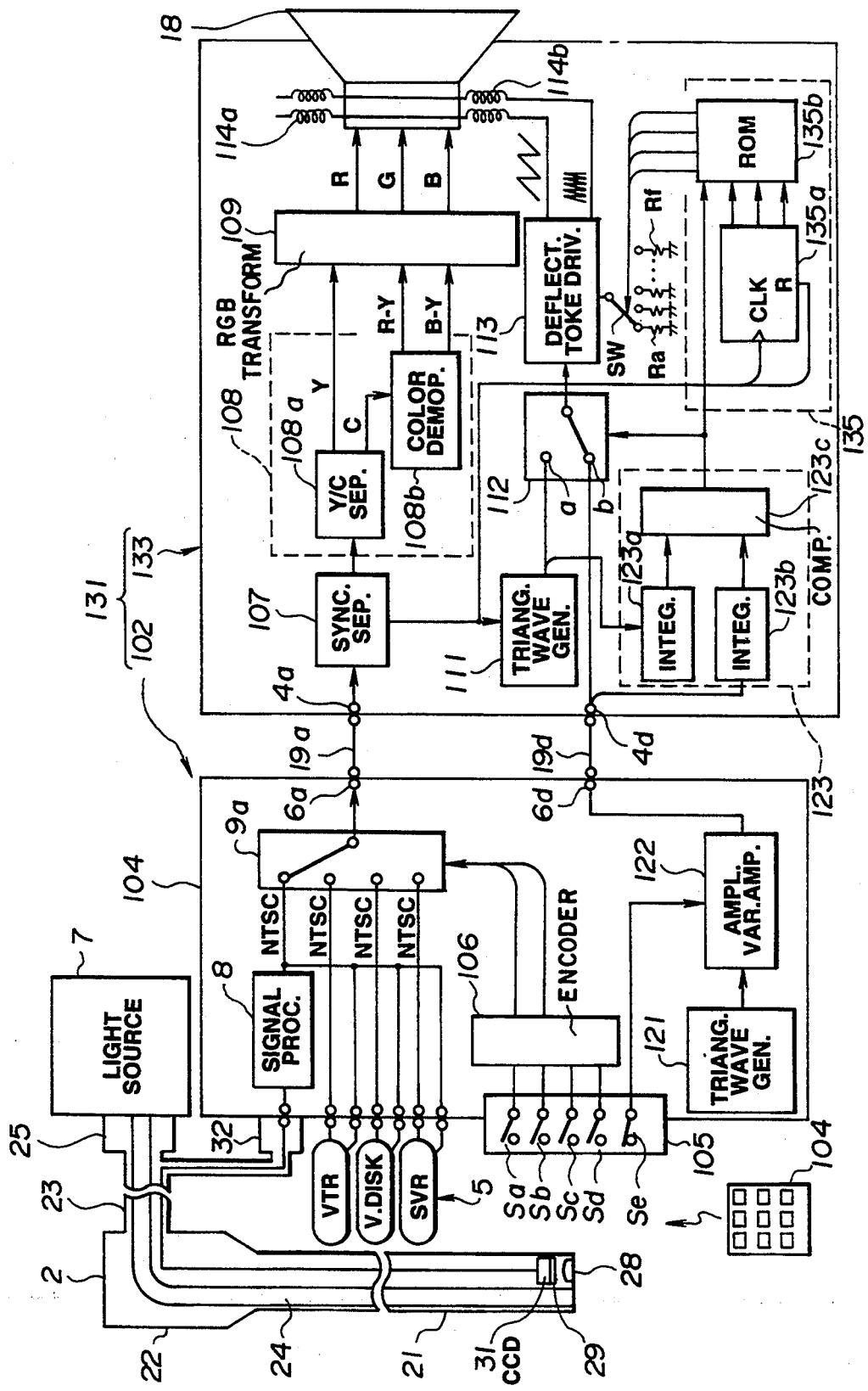

FIG. 17 shows an endoscope system 131 according to a modification of the fourth embodiment. In the present modification, the signal processing circuit 8, within the video processor 104 in FIG. 15, has an output end thereof which is connected to an NTSC signal input end of a VTR, a V.DISK and an SVR. For example, a device selecting switch and a recording switch of the remocon 140, which utilizes an infrared ray, are operated whereby it is possible to record an image signal of NTSC corresponding to an endoscope image onto any of the VTR, the V.DISK and the SVR.

Furthermore, the image signal, recorded on the VTR, the V.DISK and the SVR, is reproduced by operation of a reproducing switch of the remocon 140, and is inputted to the changing-over switch 9a from an image-signal output end.

Accordingly, the switches Sa~Sd can be operated to thereby select the image signal, to output the same to the side of an image display apparatus 133. The system 131 shows an arrangement in which recording or reproducing can be performed on the peripheral devices 5 by the image signal of NTSC system. However, recording and reproducing are possible to be performed by an another system. FIG. 1 and the like show a case where recording and reproducing can be performed even by a mode other than the NTSC system.

Further, in the modification, in the endoscope system 101 in FIG. 15, the image display apparatus 133 is used which is provided with image-distortion correction means which corrects image strain or distortion.

For example, the vertical and horizontal synchronous signals outputted from the synchronous separation circuit 107 are applied, respectively, to a reset terminal R and a clock input terminal CLK of a counter 135a which forms an image-distortion correcting-signal generating circuit 135. The counter 135a counts the horizontal synchronous signal within a single vertical period of time (about 1/60 sec.). A counted output from the counter 135 and an output from the comparator 123c control a potential resistance selecting switch SW of the deflection yoke drive circuit 113 through a ROM 135b.

The switch SW is provided with groups of potential resistors Ra~Rf which are different in resistance value, little by little, on an input end in which an output signal of a horizontal oscillation circuit (not shown), forming the deflection yoke drive circuit 113, is inputted to a horizontal drive circuit, and is capable of varying a level of a signal inputted to a horizontal drive circuit by selection of a resistance by a switch SW (with respect to a reference resistance (not shown)) (function similar to the gain control). Similar function can be realized if an attenuator, VCA, or the like, is interposed.

The ROM 135b outputs a binary signal symmetric as a substantially central value of the number of horizontal scanning lines serving as a center, with respect to a counting value of the counter 135a. That is, the ROM 135 outputs the binary signal which performs such selection as to reduce amplitude of a horizontal deflection signal at a central value and to the more increase the amplitude the more a counting value which comes off from a central value.

Figure 18:
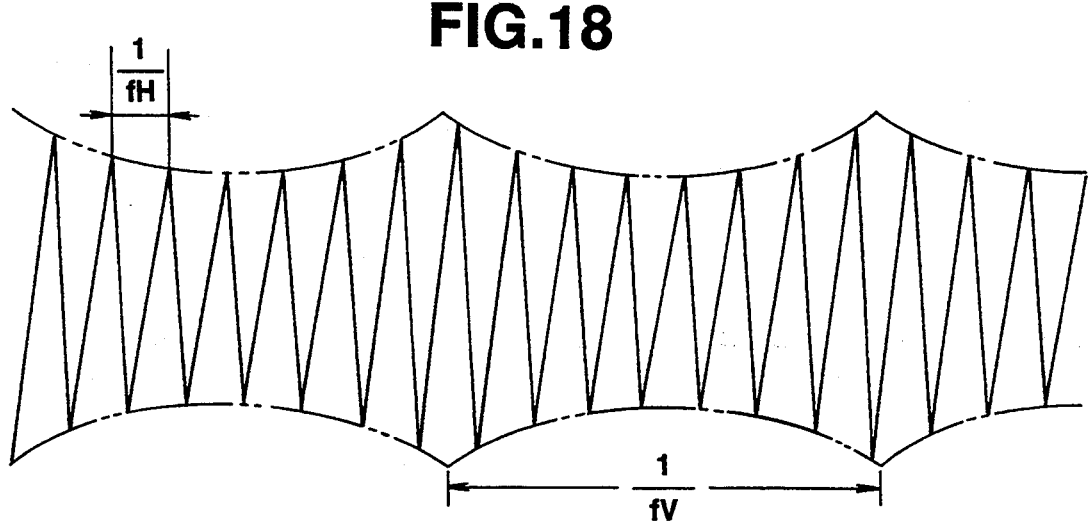
FIGS. 17 to 19 relate to a modification of the fourth embodiment of the invention, FIG. 17 being an arrangement view showing an endoscope system according to the modification of the fourth embodiment.

Accordingly, a horizontal drive signal of the deflection yoke drive circuit 113, in this case becomes one as shown in FIG. 18. Here, 1/fH is a single horizontal period of time (substantially 63.5 μsec), while 1/fV is a single vertical period of time (substantially 16.7 msec).

It will be described below that the drive signal of such waveform is used whereby an image distortion can be corrected.

When a subject of a square grid is image-picked-up by the electronic endoscope 2, since a wide angle lens is used for the objective lens 28 at the forward end of an inserting section 21, the subject becomes an image having an image distortion. Accordingly, if the image is displayed on the CRT without performing correction of the image distortion, the image becomes an image having an image distortion as shown, for example, in FIG. 19a. In the image, a grid having the same dimension is displayed by size the more larger the more a central portion, and is displayed by size the less smaller the more a periphery.

In an endoscope such as the electronic endoscope 2, or the like, it is required to narrow an inserting section, as far as possible, in order to make insertion-ability into a body cavity superior to reduce pain given to a patient. Furthermore, if length of a hard portion at a forward end of the inserting section is short as far as possible, it is possible to reduce pain given to the patient. For this reason, the arrangement is such that a diameter of an objective lens, provided at the forward end, is reduced, and the number of lenses are reduced.

Further, since it is desired that an observation field of view is wide as far as possible, a wide angle lens is used. Accordingly, distortion of an image is conspicuous more than a case of not wide angle. If an attempt is made to correct the distortion of the image by an image-signal processing system, a circuit scale increases, and the cost also increases.

Figure 19:
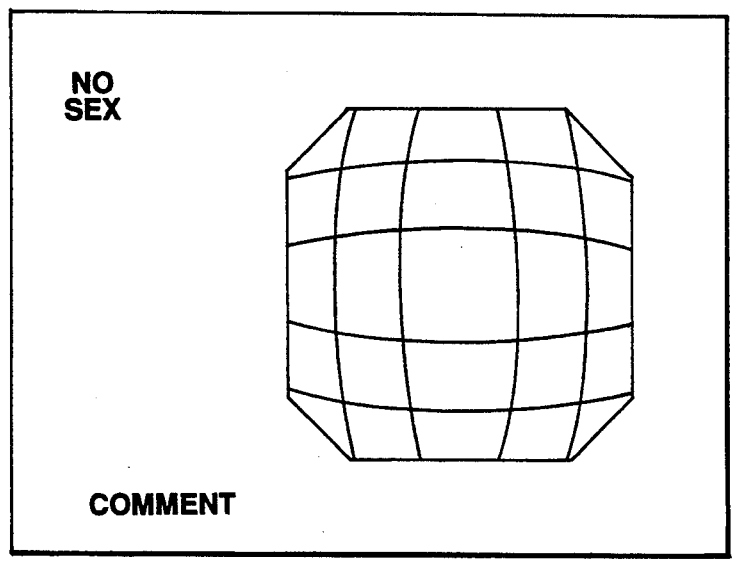
Figure 19:
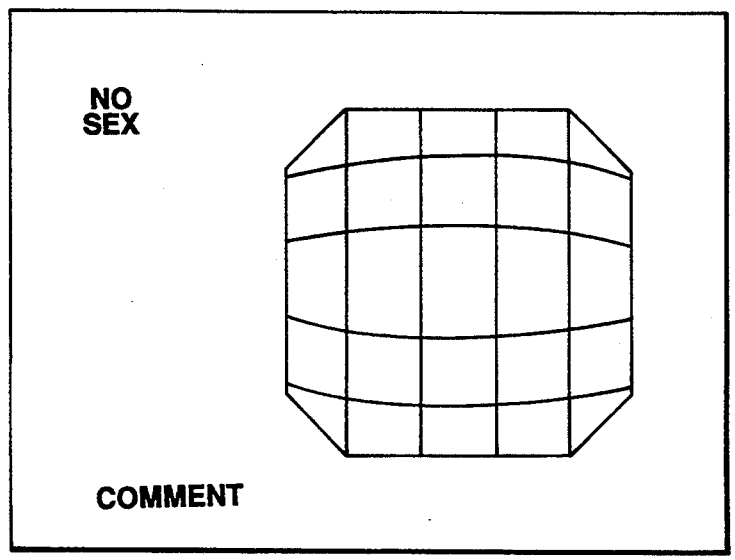

In view of the above, such a drive signal as to increase the amplitude the more the counting value in which amplitude is small, substantially at a central value of the number of horizontal scanning lines, and in which the amplitude, the more increases, the more the counting value comes off from a central value, is used within the image display apparatus 133, as described above, whereby it is possible to display the image having less distortion on the CRT 18 like the image shown in FIG. 19b.

In this system, only the horizontal drive signal is corrected. However, if the vertical drive signal is also corrected, an image further less in image distortion can be displayed.

In connection with the above, the endoscope provided with the image pickup element should not be limited to the electronic endoscope 2 illustrated in FIG. 2. The endoscope includes an endoscope in which an exterior television camera incorporating therein an image pickup element is connected to an ocular section of an optical endoscope provided with an image guide.

Moreover, the above-described various embodiments and the modifications can partially be combined with each other to form different embodiments which belong to the present invention.

What is claimed is:

1. An endoscope system comprising:
   an endoscope apparatus including;
   an endoscope having an elongated inserting section, illuminating-light outgoing means for outgoing illuminating light from the side of a forward end of said inserting section, and an image pickup element for photoelectrically converting an optical image on the basis of an objective lens which is arranged on the forward end of said inserting section; and
   a video processor having a signal processing device connected to said endoscope for performing signal processing with respect to said image pickup element to output a signal corresponding to an endoscope image image-picked-up by said image pickup element, and a plurality of output terminals for outputting a plurality of signals including said signal;
   an image display apparatus including;
   image display means for displaying an endoscope image corresponding to an inputted input signal;
   a plurality of input terminals connected to said plurality of output terminals;
   image-signal processing means for performing a plurality of signal processings different in function/characteristic from each other, with respect to said plurality of signals inputted to said plurality of input terminals, to output said input signal to said image display means; and
   selecting means for selecting one of said plurality of signal processings which are different in function/characteristic from each other;
   switching means provided on said endoscope apparatus for generating a switching signal for changing at least one signal outputted from said plurality of output terminals; and
   control means provided on said image display apparatus for controlling selection of said selecting means correspondingly to said switching signal.

2. An endoscope system according to claim 1, wherein said plurality of output terminals output a plurality of signals different in at least one of a mode and a kind from each other.

3. An endoscope system according to claim 1, wherein said plurality of output terminals output an image signal of at least one mode and a modification signal for modifying image display function of said image display means.

4. An endoscope system according to claim 1, wherein said image-signal processing system has a plurality of signal processing circuits for performing signal processing corresponding to a mode of the image signal inputted from said plurality of input terminals, and wherein said control means selects a single signal processing circuit correspondingly to said switching signal.

5. An endoscope system according to claim 1, wherein said video processor outputs a plurality of image signals different in mode from each other from said plurality of output terminals and a modification signal corresponding to said switching signal for performing setting of said input signal.

6. An endoscope system according to claim 1, wherein said endoscope apparatus further has a plurality of endoscope peripheral devices provided with function to output respective image signals thereof corresponding to said endoscope image.

7. An endoscope system according to claim 1, wherein said switching means is provided on said video processor.

8. An endoscope system according to claim 1, wherein said switching means is any one of a keyboard, a foot switch and a remote control unit.

9. An endoscope system according to claim 1, wherein said signal processing device outputs an image signal of a plurality of modes corresponding to said endoscope image.

10. An endoscope system according to claim 1, wherein said endoscope is an electronic endoscope in which said image pickup element is arranged on a focal surface of said objective lens.

11. An endoscope system according to claim 10, wherein said switching means is provided on said electronic endoscope.

12. An endoscope system according to claim wherein said video processor is connected to at least one image-signal output device for outputting image signals different in mode from each other, and has a selecting switch having a plurality of contacts connected respectively to an output end of an image-signal output device and an output end of said signal processing device, wherein selection of said selecting switch is controlled by said switching signal, and wherein a mode of at least one image signal outputted from said plurality of output terminals is selected.

13. An endoscope system according to claim 12, wherein said selecting switch selects a single device from said signal processing device and said at least one image-signal output device, by said switching signal, and wherein said plurality of output terminals output an image signal of at least one mode outputted from said single device.

14. An endoscope system according to claim 13, wherein said control means controls selection of said selecting means such that signal processing is performed which corresponds to an image signal of a single mode from an image signal of said at least one mode in accordance with said switching signal.

15. An endoscope system according to claim 1, wherein said video processor has a plurality of image-signal output terminals which output a plurality of image signals which are different in mode from each other, from said plurality of output terminals, and wherein only the image signal of a single mode is outputted from a single set of image-signal output terminals, correspondingly to said switching signal.

16. An endoscope system according to claim 15, wherein said control means has mode detecting means for detecting a mode of the image signal which is practically inputted from said plurality of input terminals.

17. An endoscope system according to claim 16, wherein said control means so controls as to perform signal processing corresponding to an image signal of the mode detected in accordance with the output signal from said mode detecting means.

18. An endoscope system according to claim 1, wherein said switching means generates a display-size setting signal for variably setting a display size of said endoscope image which is displayed by said image display means, as said switching signal.

19. An endoscope system according to claim 18, wherein said plurality of output terminals output the image signal corresponding to said endoscope image and said display-size setting signal.

20. An endoscope system according to claim 18, wherein said image display means is formed by a CRT and modifies amplitude of a serration-like drive signal generated by a deflection circuit which drives said CRT in accordance with said display-size setting signal.

21. An endoscope system according to claim 1, wherein said plurality of output terminals have an image-signal output terminal for outputting an image signal of at least one mode, and a modification-signal output terminal for outputting a modification signal different in kind from said image signal, for modifying display function of said endoscope image due to said image display means.

22. An endoscope system according to claim 21, wherein said switching means has modification-signal generating means for generating said modification signal corresponding to said switching signal.

23. An endoscope system according to claim 21, wherein said control means modifies display size of said endoscope image which is displayed by said image display means correspondingly to said modification signal.

24. An endoscope system according to claim 21, wherein said control means correct image distortion of said endoscope image which is displayed by said image display means correspondingly to said modification signal.

25. An endoscope system according to claim 1, wherein a plurality of output terminals output a plurality of image signals different in mode from each other.

26. An endoscope system according to claim 25, wherein said plurality of image signals different in mode from each other are different from each other in the number of transmitting lines which transmit the image signals every modes.

27. An endoscope system according to claim 25, wherein said plurality of image signals different in mode from each other are different from each other in the number of scanning lines of said image signals every modes.

28. An endoscope system according to claim 25, wherein said plurality of output terminals output an image signal of at least two modes of NTSC, Y/C and RGB.

29. An endoscope system according to claim 25, wherein said plurality of output terminals output an image signal of a mode of NTSC or PAL.

30. An endoscope system comprising:
an endoscope apparatus including;
an endoscope having an elongated inserting section, illuminating-light outgoing means for outgoing illuminating light from the side of a forward end of said inserting section, and an image pickup element for photoelectrically converting an optical image on the basis of an objective lens which is arranged on the side of the forward end of said inserting section; and
a video processor having signal processing means connected to said endoscope for performing signal processing with respect to said image pickup element to output an image signal corresponding to an endoscope image image-picked-up by said image pickup element;
an image display apparatus including:
image display means connected to said video processor for displaying said inputted image signal on a display surface of a CRT; and
a deflection drive circuit for generating a deflection drive signal which two-dimensionally scans an electron beam of said CRT in order to display an image on said display surface;
operation means provided on said endoscope apparatus for performing operation to modify display function of the image displayed on said display surface, and operational-signal generating means for generating an operational signal corresponding to said operation; and
display modifying means provided on said image display apparatus for modifying at least one of amplitude and waveform of said deflection drive signal correspondingly to said operational signal.

31. An endoscope system comprising:

an endoscope apparatus including;

an endoscope having an elongated inserting section, illuminating-light outgoing means for outgoing illuminating light from the side of a forward end of said inserting section, and an image pickup element for photoelectrically converting an optical image on the basis of an objective lens which is arranged on the side of the forward end of said inserting section;

a first image-signal output device for outputting an image signal of at least one mode corresponding to an endoscope image; and a video processor having a second image-signal output device connected to said endoscope for performing signal processing with respect to said image pickup element to output an image signal of at least one mode corresponding to an endoscope image which is image-picked-up by said image pickup element, switching means connected to output ends of the respective first and second image-signal output devices for selectively outputting an image signal which is outputted from said first and second image-signal output devices, and a plurality of output terminals connected to said switching means, for outputting an image signal of a plurality of modes, an image display apparatus including:

image display means for displaying an endoscope image corresponding to an input signal inputted;

a plurality of input terminals connected to said plurality of output terminals;

image-signal processing means provided with a plurality of signal processing circuits for performing a plurality of signal processings corresponding respectively to said image signal of a plurality of modes which are inputted to said plurality of input terminals; and selecting means for selecting a single signal processing circuit from said plurality of signal processing circuits to output a signal outputted from said single signal processing circuit to said image display means, as said input signal;

switching operational means provided on said endoscope apparatus for performing operation to control selection of said switching means and for generating a switching signal for modifying an image signal which is outputted from said plurality of output terminals; and control means provided on said image display apparatus for controlling selection of said selecting means correspondingly to said switching signal.

* * * * *